United States Patent
Richardson et al.

(10) Patent No.: US 6,433,759 B1
(45) Date of Patent: Aug. 13, 2002

(54) VIDEO PROCESSING METHODS AND APPARATUS FOR GAZE POINT TRACKING

(75) Inventors: Jim Richardson, Philomath; Birch Zimmer; Michael A. Hardwick, both of Corvallis, all of OR (US)

(73) Assignee: Eye Control Technologies, Inc., Corvallis, OR (US)

( * ) Notice: Subject to any disclaimer, the term of this patent is extended or adjusted under 35 U.S.C. 154(b) by 0 days.

(21) Appl. No.: 09/559,120

(22) Filed: Apr. 26, 2000

Related U.S. Application Data

(63) Continuation of application No. 09/099,123, filed on Jun. 17, 1998, now Pat. No. 6,091,378.

(51) Int. Cl.$^7$ .................................................. G09G 5/00
(52) U.S. Cl. .............................. 345/7; 345/8; 345/156; 345/157; 345/166; 345/961
(58) Field of Search ................................ 345/7, 8, 156, 345/157, 166, 961

(56) References Cited

U.S. PATENT DOCUMENTS

| | | |
|---|---|---|
| 4,554,636 A * | 11/1985 | Maggi et al. |
| 4,648,052 A | 3/1987 | Friedman et al. |
| 4,891,630 A | 1/1990 | Friedman et al. |
| 4,973,149 A | 11/1990 | Hutchinson |
| 5,260,734 A | 11/1993 | Shindo |
| 5,471,542 A | 11/1995 | Ragland |
| 5,491,492 A | 2/1996 | Knapp et al. |
| 5,689,619 A | 11/1997 | Smyth |
| 5,751,260 A | 5/1998 | Nappi et al. |
| 6,091,378 A * | 7/2000 | Richardson et al. ........... 345/7 |

OTHER PUBLICATIONS

John Markus, "Modern Electronic Circuits Reference Manual", McGraw–Hill Book Comp, 1980, pp. 161–168.*

* cited by examiner

Primary Examiner—Richard Hjerpe
Assistant Examiner—Henry N. Tran
(74) Attorney, Agent, or Firm—Klarquist Sparkman, LLP

(57) ABSTRACT

A gaze point tracking apparatus is provided having a comparator that receives a video signal corresponding to an eye image or a beacon image. The comparator produces a processed video signal that consists of two signal levels. A video processor detects and measures transitions between the two signal levels. The detected transitions are used to determine the location of a gaze point on a display.

4 Claims, 19 Drawing Sheets

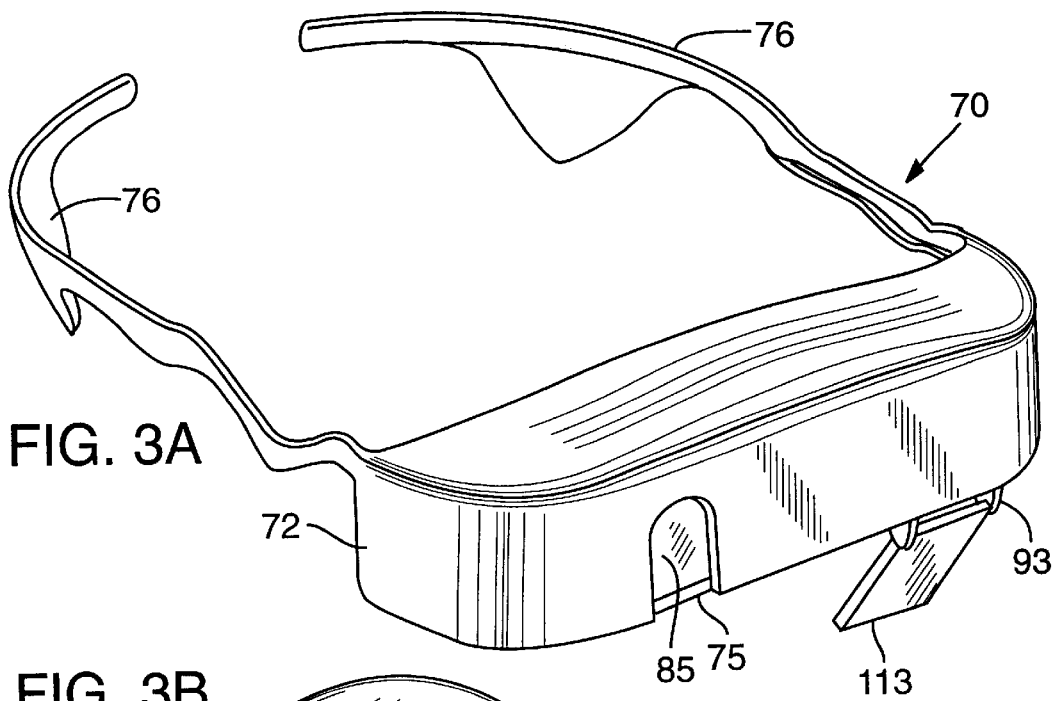
FIG. 3A
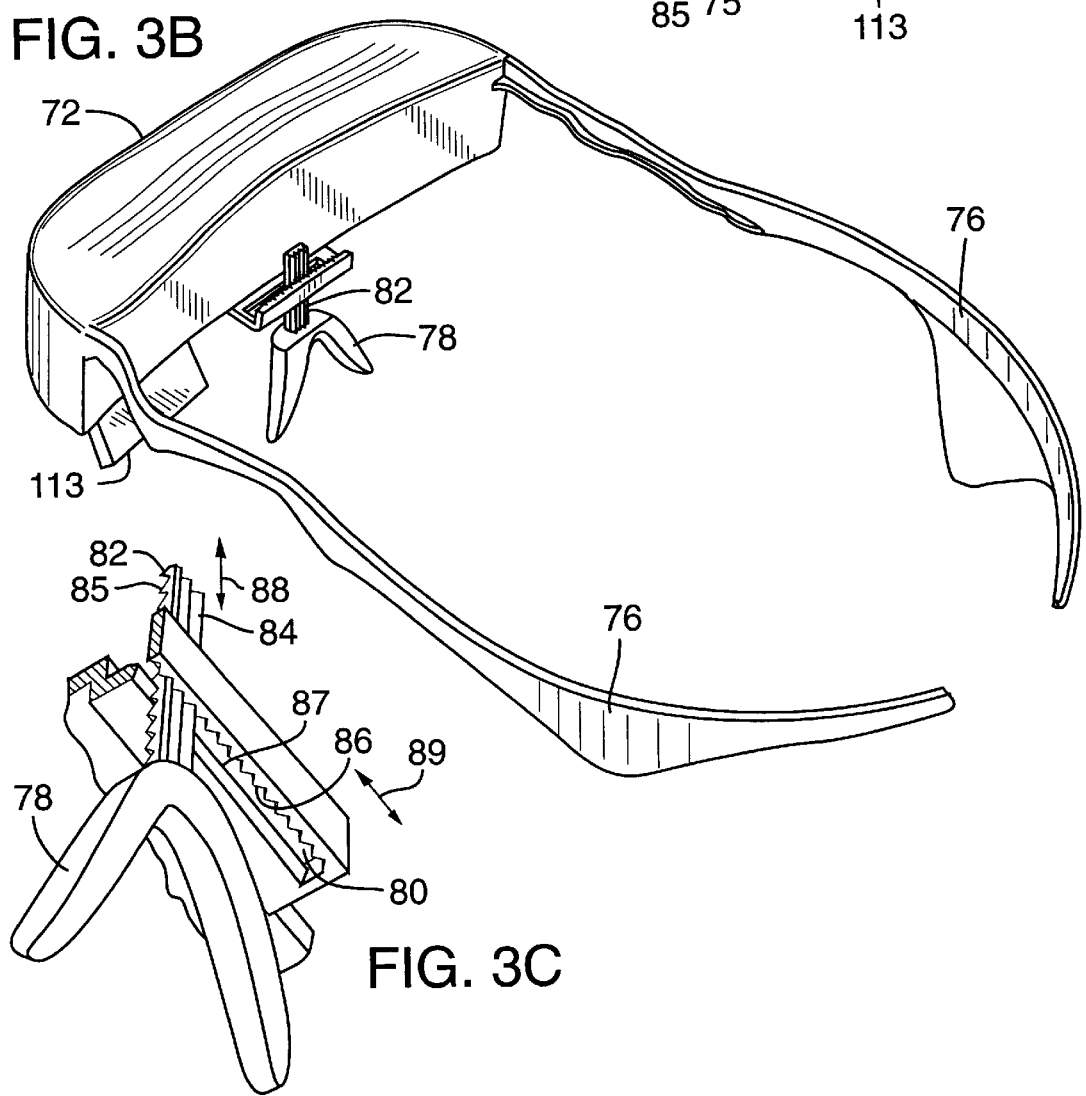
FIG. 3B
FIG. 3C

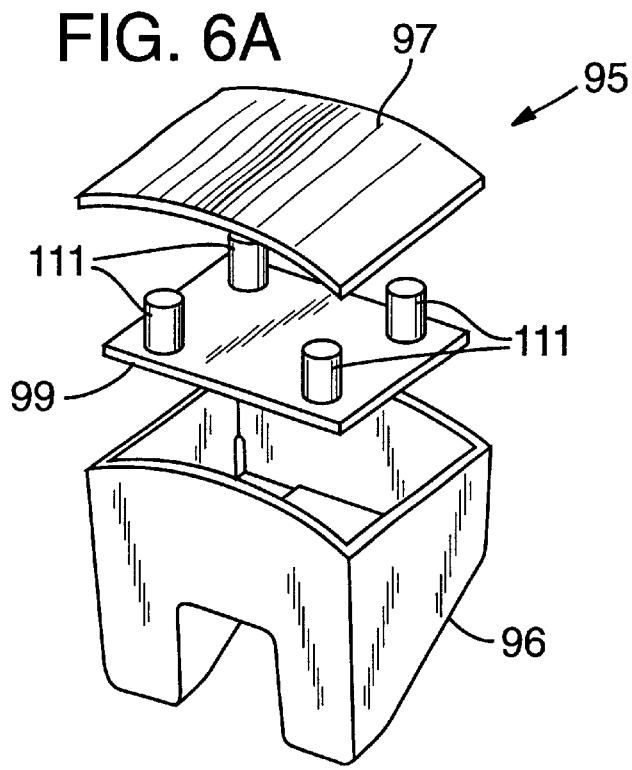
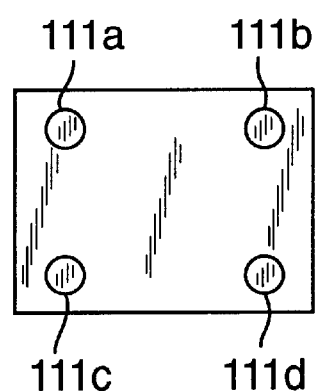
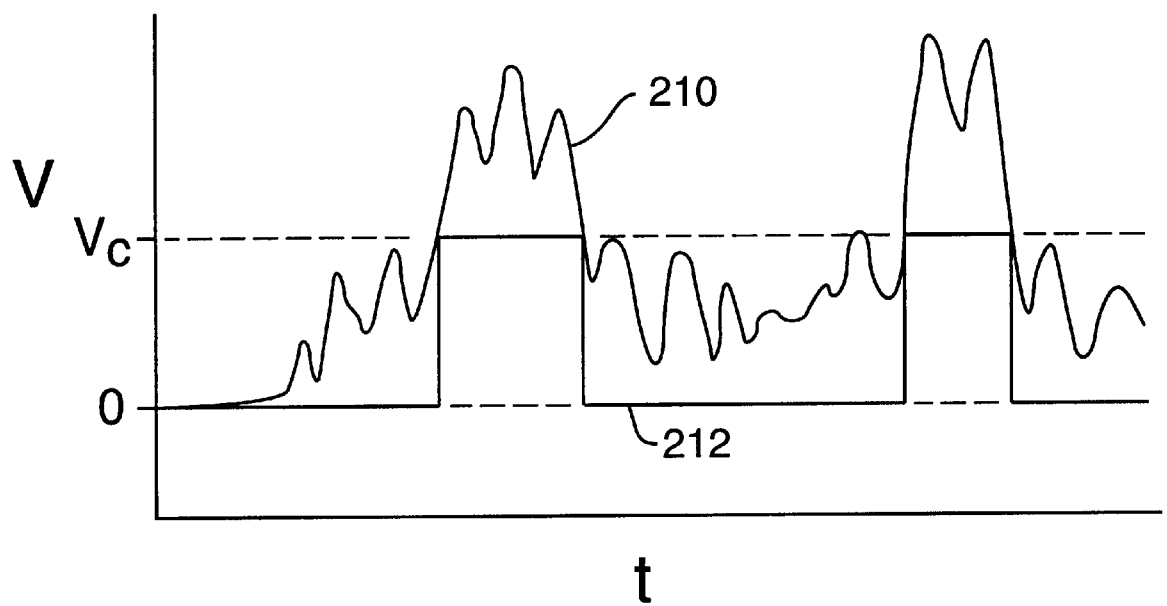

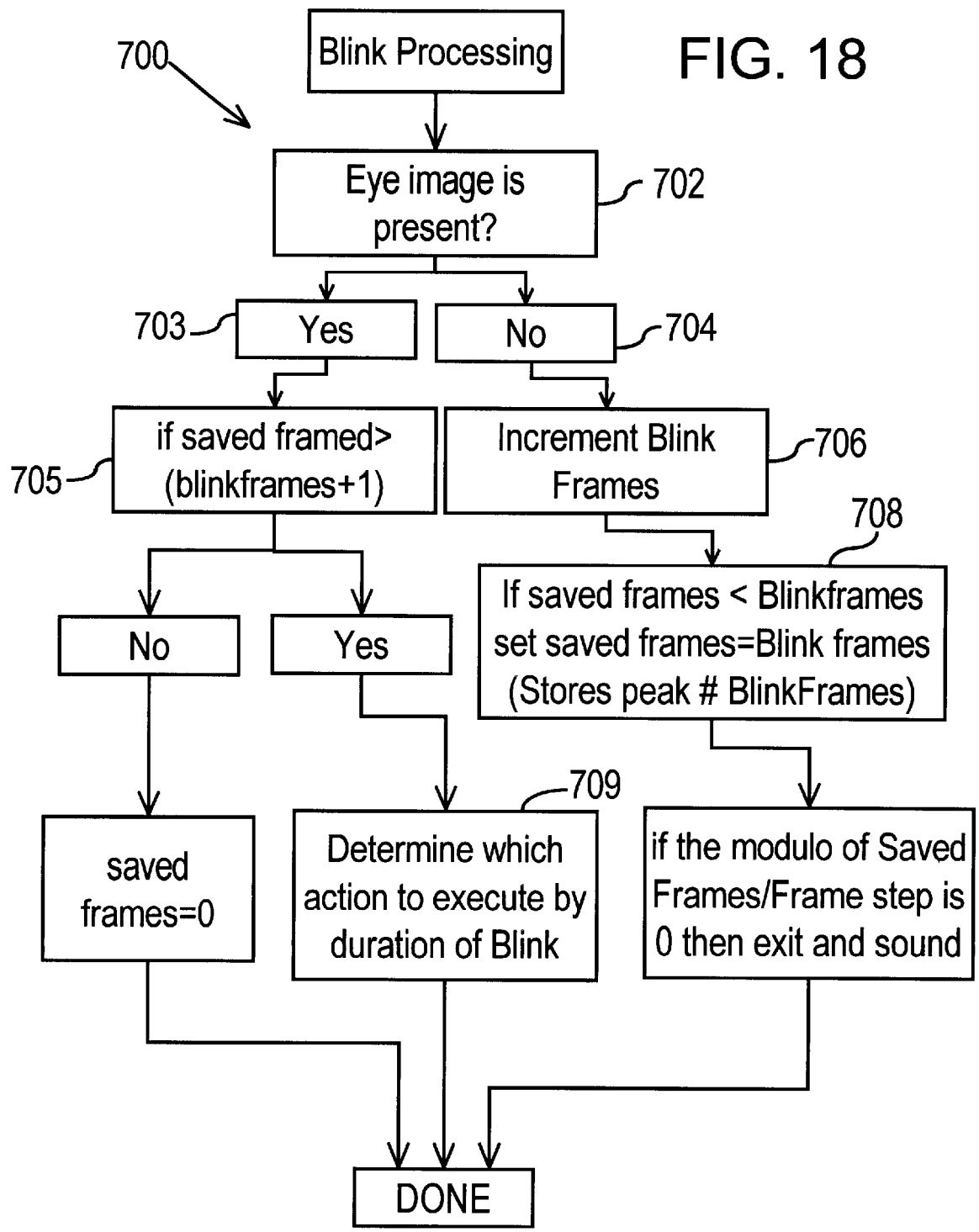

VIDEO PROCESSING METHODS AND APPARATUS FOR GAZE POINT TRACKING

This application is a continuation of application Ser. No. 09/099,123, filed Jun. 17, 1998, and now issued as U.S. Pat No. 6,091,378.

FIELD OF THE INVENTION

The invention pertains to methods and apparatus for tracking the gaze point of an eye.

BACKGROUND OF THE INVENTION

Various systems have been developed for measuring head movement ("head tracking") and the gaze of an eye ("gaze point tracking") with respect to a video display terminal or other display device. In many such systems, a video signal corresponding to an image of a reference point is received as a video signal that is digitized and stored in a memory called a frame buffer. Because the video signal corresponding to a single image contains approximately 500 rows by 500 columns of individual pixel signals, a large memory is required for the frame buffer. The stored image is then processed to identify and locate objects within the image.

Image processing in this way has many drawbacks. First, an entire array of pixels for an image must be digitized and stored, requiring a large memory for the frame buffer. Processing the digitized image data is complex and it is difficult to identify images corresponding to the head or eye in the image. In addition, if image processing is to be fast enough to permit head or eye tracking, expensive signal processing systems are necessary. These problems are particularly severe in cost-sensitive applications. Accordingly, improved methods and apparatus are needed for simple, inexpensive image processing.

SUMMARY OF THE INVENTION

An apparatus for processing a video signal in a gaze point or head tracking system is provided. The apparatus comprises a comparator that receives a video signal at a first input and a reference signal from a reference source at a second input. The comparator produces a first output level at an output for portions of the video signal larger than the reference signal and a second output level for portions of the video signal less than the reference level, producing a processed video signal at the output.

A logical processor, such as a complex programmable logic device, receives the processed video signal and identifies "events" corresponding to transitions between the first and second output levels. Events are stored in a memory as event coordinates that locate the event in the image and a direction of transition (first to second or second to first output levels). If there is more than one video source or more than one reference signal, the events also contain a coordinate identifying the video source or reference level.

A video processor receives event coordinates and identifies objects as object coordinates. The objects are associated with features in, for example, an eye image or a beacon image. The object coordinates are processed to determine head location relative to a beacon or a direction of gaze of an eye. If the gaze point tracking apparatus is used in conjunction with a computer, object processing can be carried out by the computer. Alternatively, a separate processor can be provided.

A microcontroller is provided for adjusting the reference signal, or the reference signal can be adjusted manually.

In a gaze point tracking system used with a computer, video signals corresponding to both head and eye images are processed. A software component is provided that contains instructions for video processing and calibration. The calibration instructions permit the gaze point of a user's eye to be associated with a position on display and a cursor to be displayed at the gaze point. After calibration, the gaze point is tracked as the eye and head move. Alternatively, only head movement or eye movement can be tracked.

The software component comprises a setup component that permits the user to associate various eye movements (including blinking) with instructions to the computer. In addition, the setup component permits the user to direct that the cursor be moved to coincide with the gaze point, or that the cursor be moved toward the gaze point. The setup component also permits the user to set a gaze point/cursor misalignment for which the cursor is not moved. This permits the cursor to remain fixed for small movements of the gaze point. In addition, the setup component can associate rapid or large movements of the gaze point with instructions to the computer. The software component can be provided on a computer readable medium, such as a CD-ROM.

Other features and advantages of the invention will be apparent from the following detailed description and accompanying drawings.

BRIEF DESCRIPTION OF THE DRAWINGS

FIGS. 3A–3B are schematic perspective views of the headset of the gaze point tracking system of FIG. 2.

FIG. 3C is a schematic view of a headset nosepiece.

FIG. 6A is a perspective view of the beacon.

FIG. 6B illustrates an arrangement of LEDs in the beacon of FIG. 6A.

FIG. 10 illustrates the operation of the video processing circuit of FIGS. 9A–9B on a portion of a composite video signal, illustrating the determination of event data.

FIG. 18 is a block diagram illustrating blink processing.

DETAILED DESCRIPTION

Figure 1:
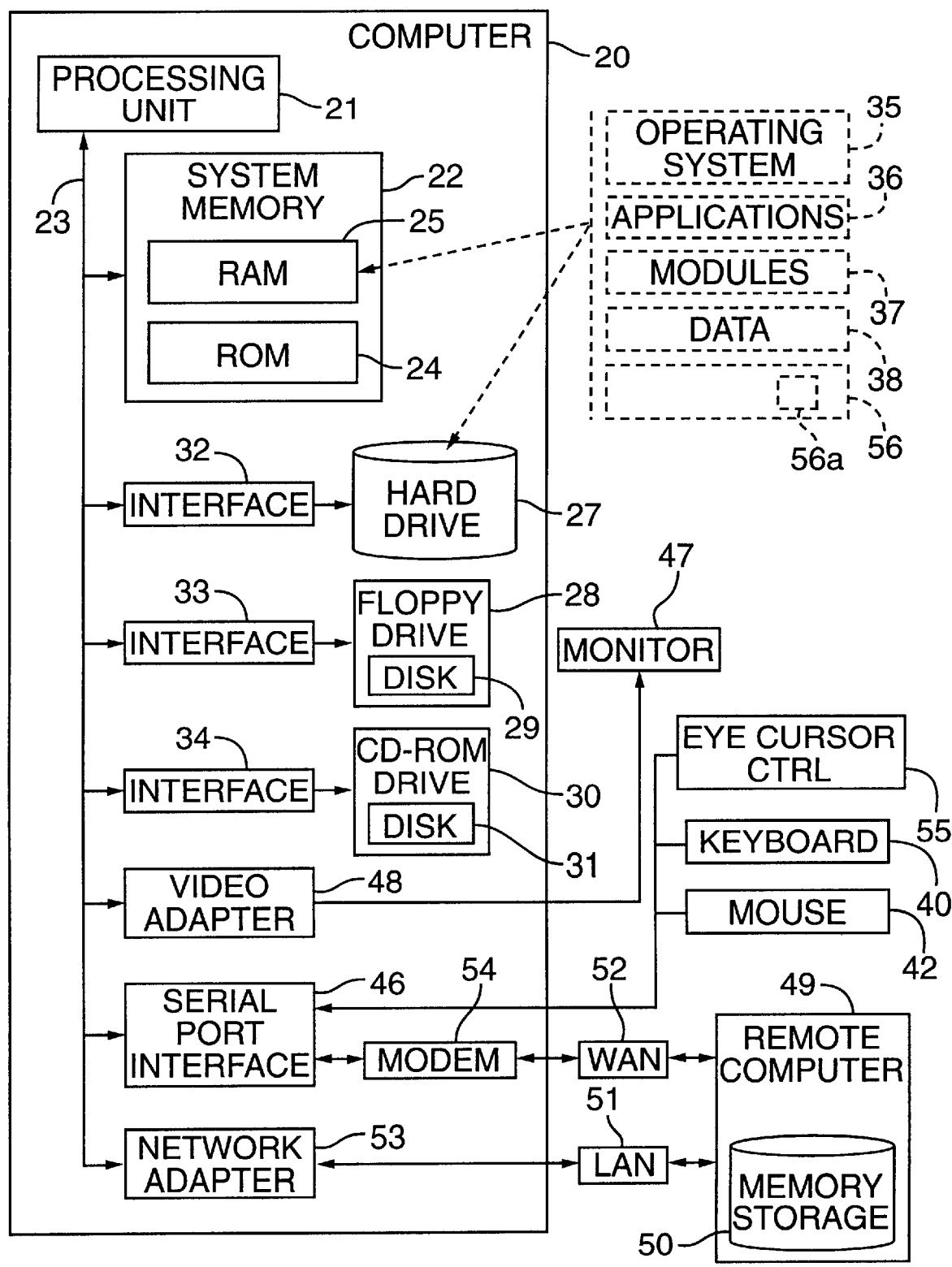
FIG. 1 is an illustration of a computer system equipped with a gaze point tracking system.

An embodiment of the invention is described with reference to an gaze point tracking system for use with a computer system, such as a personal computer. With reference to FIG. 1, an exemplary computer system includes a computer 20 (e.g., a server computer, a personal computer or other like computer), including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

Any of several types of bus structure can be used including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system (BIOS), containing the basic routines that help to transfer information between elements within the computer 20, such as during start-up, is stored in ROM 24.

The computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38.

A user may enter commands and information into the computer 20 through an gaze point tracking system 55, a keyboard 40, or a pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as an IEEE 1394 ("FIREWIRE") interface, a parallel port, game port, or a universal serial bus (USB). Program modules are generally associated with input devices. In particular, a driver module 56 is associated with the gaze point tracking system 55.

A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote computer 49. The remote computer 49 may be a server, a router, a peer device or other common network node, and typically includes many or all of the elements described relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN, the computer 20 is connected to the local network 51 through a network interface or adapter 53. When used in a WAN, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 2:
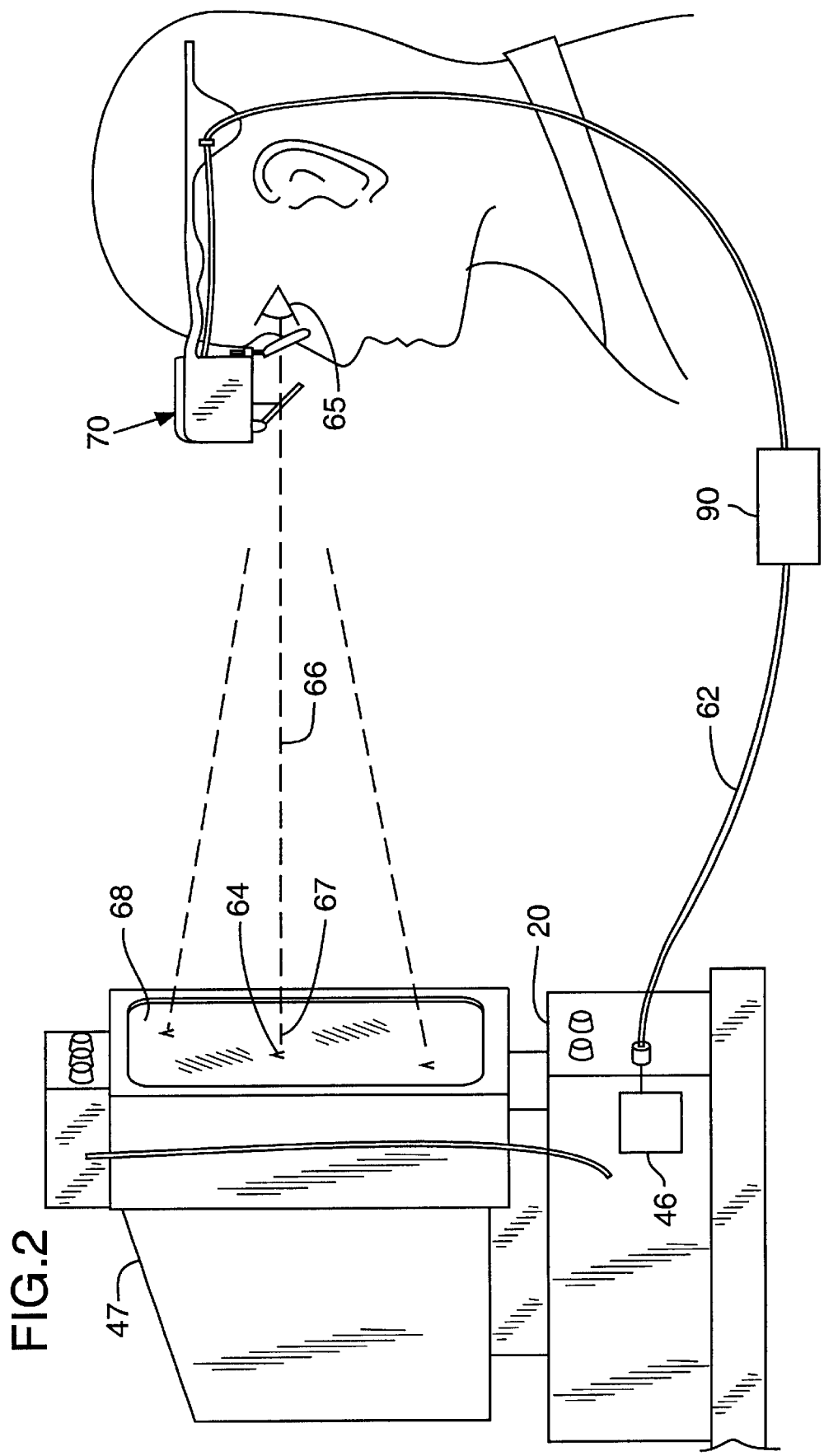
FIG. 2 is an illustration of the gaze point tracking system of FIG. 1.

With reference to FIG. 2, the gaze point tracking system 55 comprises a headset 70 in communication with a video processor 90 via a cable 62. The video processor 90 is in communication with the computer 20 via the serial port interface 46. A movable cursor 64 can be displayed on the monitor 47 by the computer 20 and a beacon 95 is mounted on or fixed with respect to the computer monitor 47.

The gaze point tracking system 55 detects a location 67, referred to herein as the gaze point 67, on the monitor 47 at which a line of sight 66 of an eye 65 intersects a display screen 68. The cursor 64 is controlled to move as the gaze point 67 moves. The gaze point tracking system 55 can also detect rapid movements or blinking of the eye 65; these motions are an alternative to clicking the mouse 42 for providing instructions or other input to the computer 20.

With reference to FIGS. 3A–3C, the headset 70 comprises a housing body 72 and a housing closure 75. The headset 70 is supported on the user's head with temple pieces 76 and a nose bridge 78. The nose bridge 78 extends to a slot 80 defined by the housing 72; the nose bridge 78 has an extension 82 that is slidable within the slot 80 for adjustment. After adjustment by the user, the nose bridge 78 is retained by the interaction of a serrated edge 86 and an edge 87 of the slot 80 with serrations 84, 85, respectively of the slot 80. The edge 87 and the serrations 85 inhibit motion of the nosepiece 78 parallel to a direction 88; the edge 86 and the serrations 84 inhibit motion parallel to a direction 89.

Figure 4:
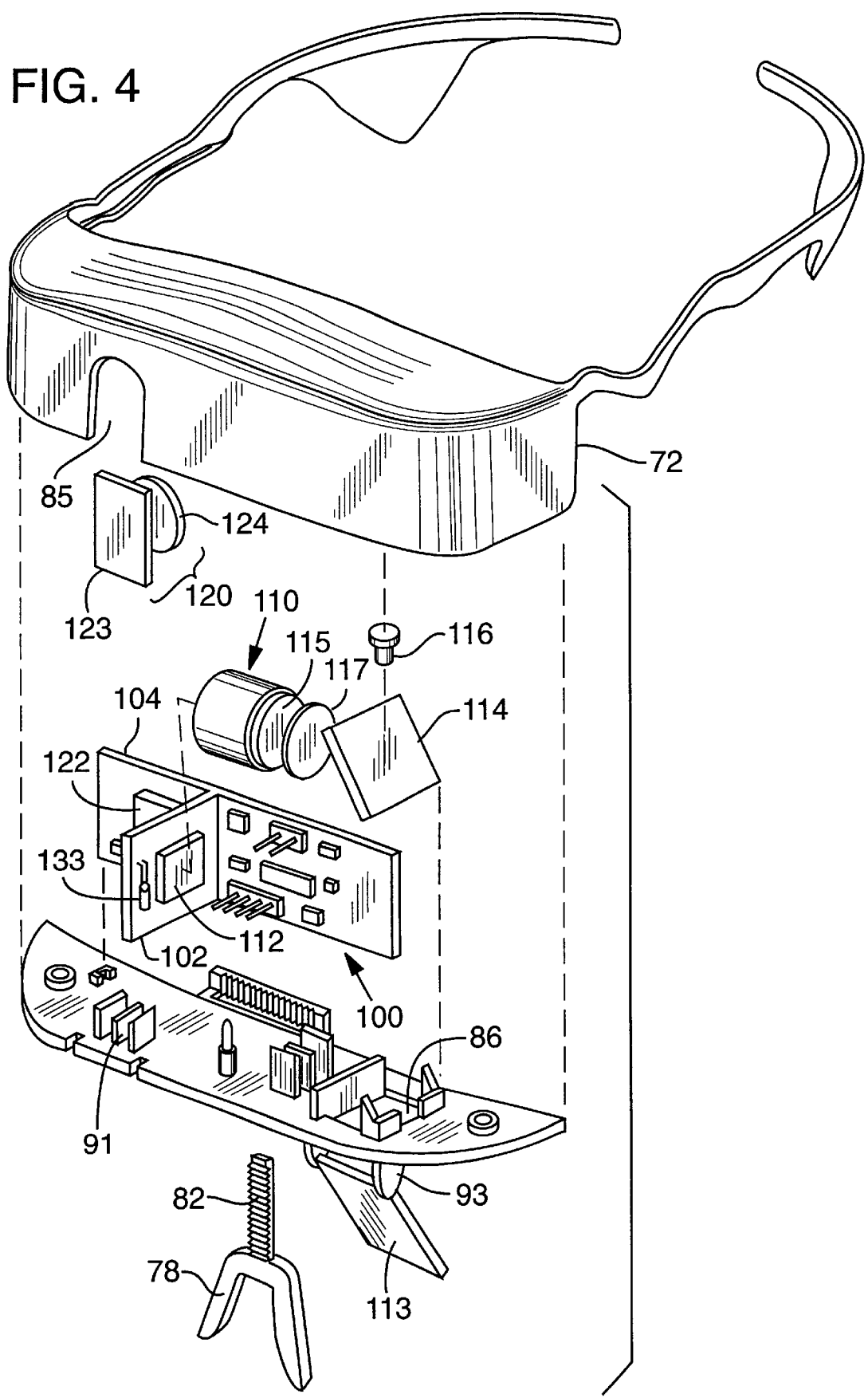
FIG. 4 is a perspective view of the headset and a dual camera circuit board assembly.

With reference to FIG. 4, the housing body 72 and the housing closure 75 are provided with apertures 85, 86, respectively, to permit a light flux to enter or exit the headset 70. Mounting slots 91 and a mounting extension 93 are also provided. Additional mounting features are molded into the housing 70 but are not shown in the figures.

Further referring to FIG. 4, the housing body 72 contains a dual camera circuit board assembly 100. The circuit board assembly 100 comprises an eye camera circuit board 102 and a field camera circuit board 104. Eye optics 110 and field optics 120 attach to the housing 72 and image the eye 65 and the beacon 95 onto image sensors 112, 122, respectively. In the preferred embodiment, the image sensors 112, 122 are OV5006 CMOS image sensors, available from OmniVision, Inc., San Jose, Calif. USA. These image sensors consist of an array of 384 columns and 288 rows of individual photosensors, but may have higher resolution.

The eye optics 110 comprise a partially transmitting mirror 114 and a lens or lens system 115. A hot mirror 113 attached to the housing 72 at the mounting extension 93 reflects infrared light from the eye 65 to the eye optics 110 while transmitting visible light. The partially reflecting mirror 114 directs the infrared flux to the lens system 115 that images the eye 65 onto the image sensor 112. An infrared light emitting diode (LED) 116 is situated to illuminate the eye by emitting infrared light that is transmitted by the partially reflecting mirror 114 and reflected by the hot mirror 113 to the eye. By illuminating and imaging the eye with infrared light, the user is largely unaware of the illumination. Because the hot mirror 113 transmits visible light, the user can view the monitor 47 through the hot mirror 113. In addition, because infrared light is used, additional visible light blocking, infrared transmitting filters can be provided, such as a filter 117, to reduce the intensity of the visible light reaching the image sensor 112.

The field optics 120 are situated to image the beacon 95 onto the image sensor 122. The field optics 120 comprise a lens or lens system 124 and an infrared transmitting, visible light blocking filter 123. The filter 123 is conveniently made of a filter glass, such as RG780 filter glass, available from Schott Optical Glass, Duryea, Pa.

Figure 5A:
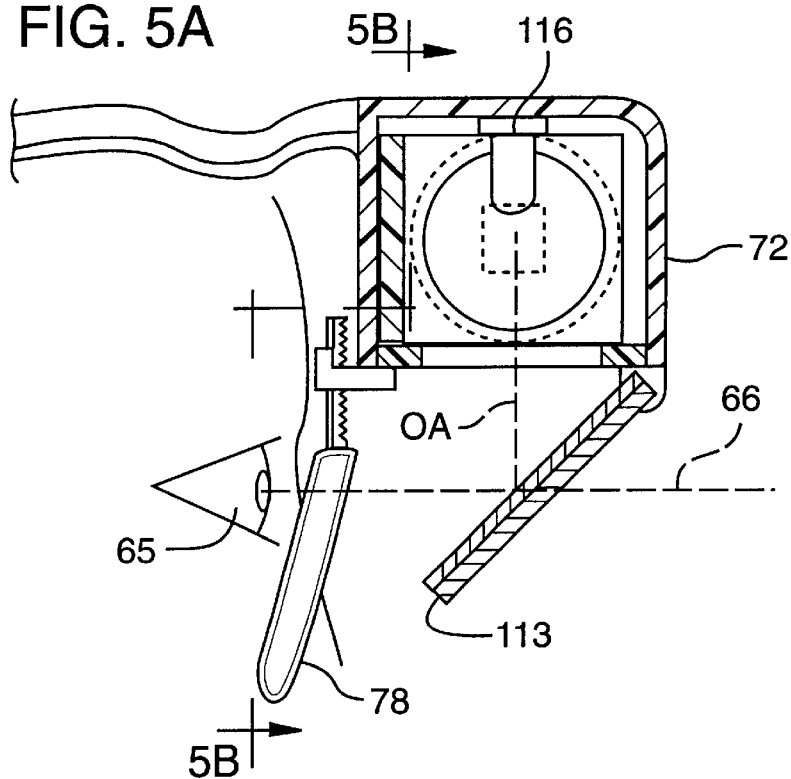
FIGS. 5A–5B are additional cross sectional views of the headset of FIG. 4.
Figure 5B:
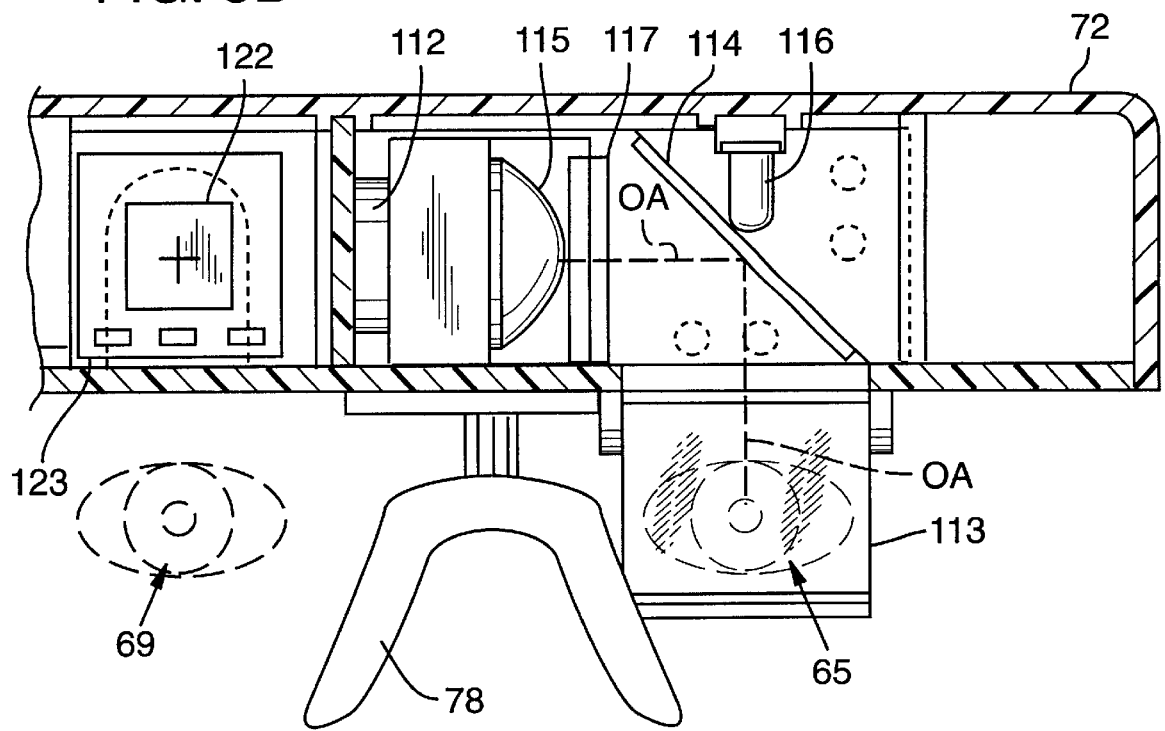

Referring now to FIGS. 5A–5B, the user looks through the hot mirror 113 along the line of sight 66. The LED 116 illuminates the eye 65 along an optical axis OA and infrared light from the eye 65 propagates to the hot mirror 113 and then along the optical axis OA to the partially reflecting mirror 114 and to the lens 115 and image sensor 112. The LED 116, the lens 115, and the image sensor 112 are situated along the optical axis OA so that the eye 65 is illuminated along the optical axis OA. FIG. 5B also shows the user's other eye 69. By illuminating the eye 65 coaxially (i.e., along the axis OA), eye movement can be detected with either a corneal reflection method or a bright pupil method, or both methods.

With reference to FIG. 6, the beacon 95 comprises a plurality of infrared LEDs 111 (LEDs 111a–111d) whose peak emission is at a wavelength of 880 nm. The LEDs 111 are contained by a housing 96 and mounted on a circuit board 99. A cover plate 97 transmits the light flux emitted by the LEDs 111. The cover plate 97 is conveniently made of an infrared transmitting, visible light blocking material so the user does not see the LEDs 111. Alternatively, the cover plate can be made of a transparent material. The LEDs 111 can be powered by connection to the computer 20, the headset 70, the video processor 90, or batteries can be provided. The lens system 124 images the LEDs 111 on the image sensor 122. In the preferred embodiment, the beacon 95 is arranged with respect to the monitor 47 so the 1.000 inch spacing is horizontal.

The beacon 95 is fixed with respect to the monitor 47 and permits determining the location of the user's head with respect to the monitor 47. Other fixed position references can be substituted for the beacon 95. For example, LEDs or laser diodes can be mounted on the headset 70 to illuminate mirrors fixed with respect to the monitor 47. Reflections from the mirrors replace the illumination from the LEDs 111 of the beacon 95. Alternatively, portions of the display screen 68 can serve as position references. For example, the monitor 47 can form illuminated regions at the corners of the display screen 68. Alternatively, edges of the display screen 68 can be used.

In the preferred embodiment, infrared light is used to image the eye 65 and the beacon 95. The use of infrared light permits visible light to be blocked so that the image sensors 112, 122 receive primarily the infrared light associated with the LED 116 and the LEDs 111, respectively. By blocking visible light, the number of objects imaged onto the image sensors 112, 122 is reduced, simplifying analysis of the video signals. Although the use of infrared light has these advantages, visible light can also be used.

The image sensors 112, 122 produce composite video signals. As used herein, a composite video signal is a time-varying electrical voltage corresponding to a repetitive row by row read-out of individual photosensors of an image sensor. In addition, the composite video signal contains a horizontal synchronization voltage ("horizontal sync") that marks the beginning of the read-out of a row of photosensors and a vertical synchronization voltage ("vertical sync") that marks the beginning of the read-out of the first row of photosensors. The horizontal sync, the vertical sync, and the photosensor signals form the composite video signal. A composite video signal corresponding to the signals from an entire array of photosensors is referred to herein as a "frame." Individual photosensors or the portion of an image corresponding to an individual sensor is referred to herein as a "pixel." Locations of individual pixels in an image are conveniently described with reference to an (x,y) coordinate system, in which x is a horizontal coordinate, measured from left to right in an image as displayed, and y is vertical coordinate, measured from top to bottom as the image is displayed. It will be apparent that these coordinate directions are arbitrary and other directions can be chosen.

Figure 7:
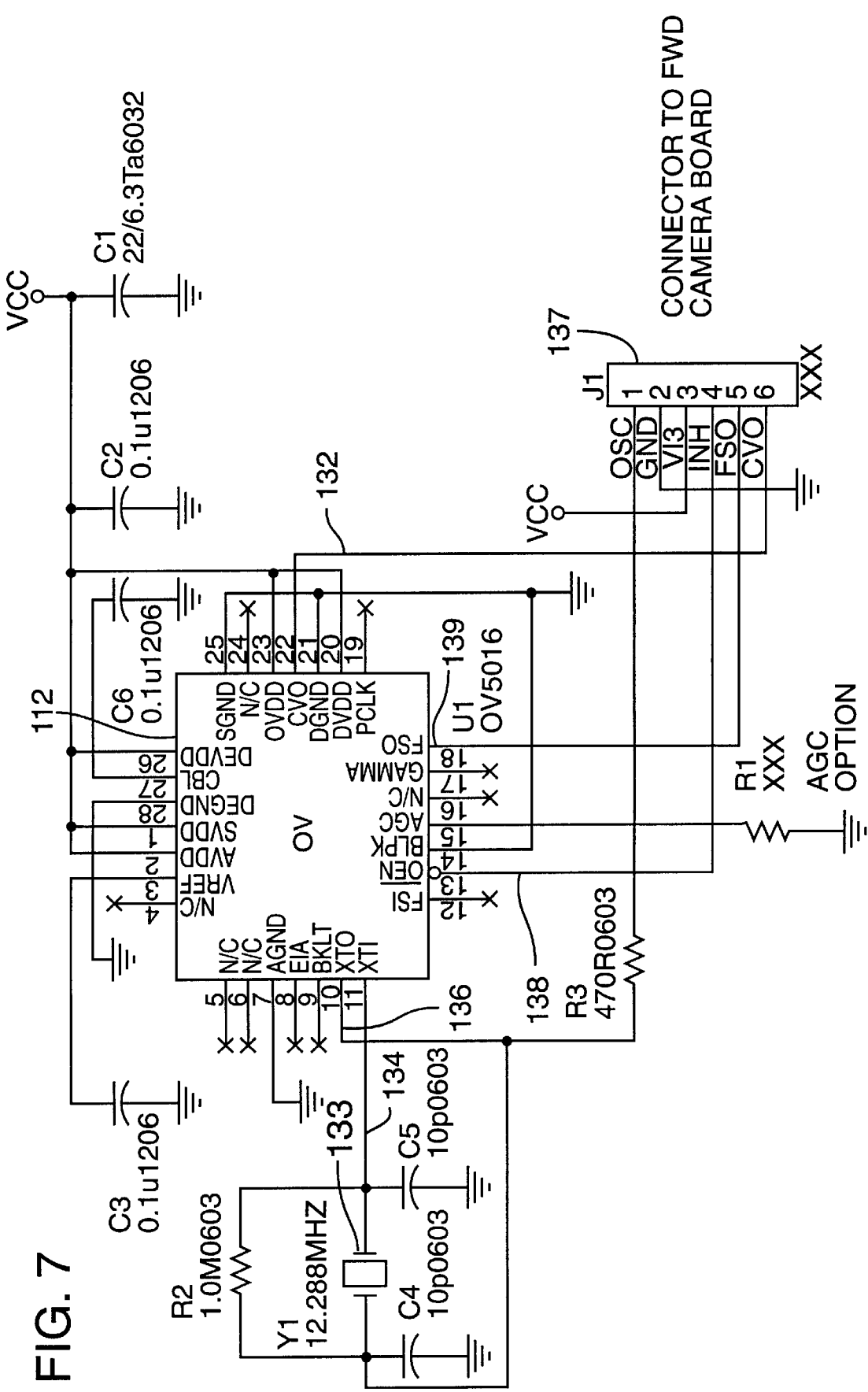
FIG. 7 is an electrical schematic of electronics associated with an image sensor for imaging a user's eye.

With reference to FIG. 7, a composite video signal from the image sensor 112 is delivered to a composite video output ("CVO") 132. The rate at which pixels are read-out is determined by a crystal 133 that supplies a clock frequency of 12.28 MHZ to a clock input 134 of the image sensor 112. The image sensor 112 provides a clock output 136 at one-half the frequency as that presented to the clock input 134. The image sensor 112 also provides a frame synchronization signal ("FSO") at an output 139. The image sensor has an inhibit input ("OEN") at an input 138. The inhibit input 138 can be used to prevent the image sensor 112 from delivering composite video to the output 132.

The image sensor 112 and the clock output 136 are connected to the field camera circuit board 104 by a connector 137 that also serves to attach the eye camera circuit board 102 to the field camera circuit board 104. The connector 137 also delivers power and an inhibit input from the field camera circuit board 104 to the eye camera circuit board 102 as well as delivering CVO and FSO to the field camera circuit board 104.

Figure 8:
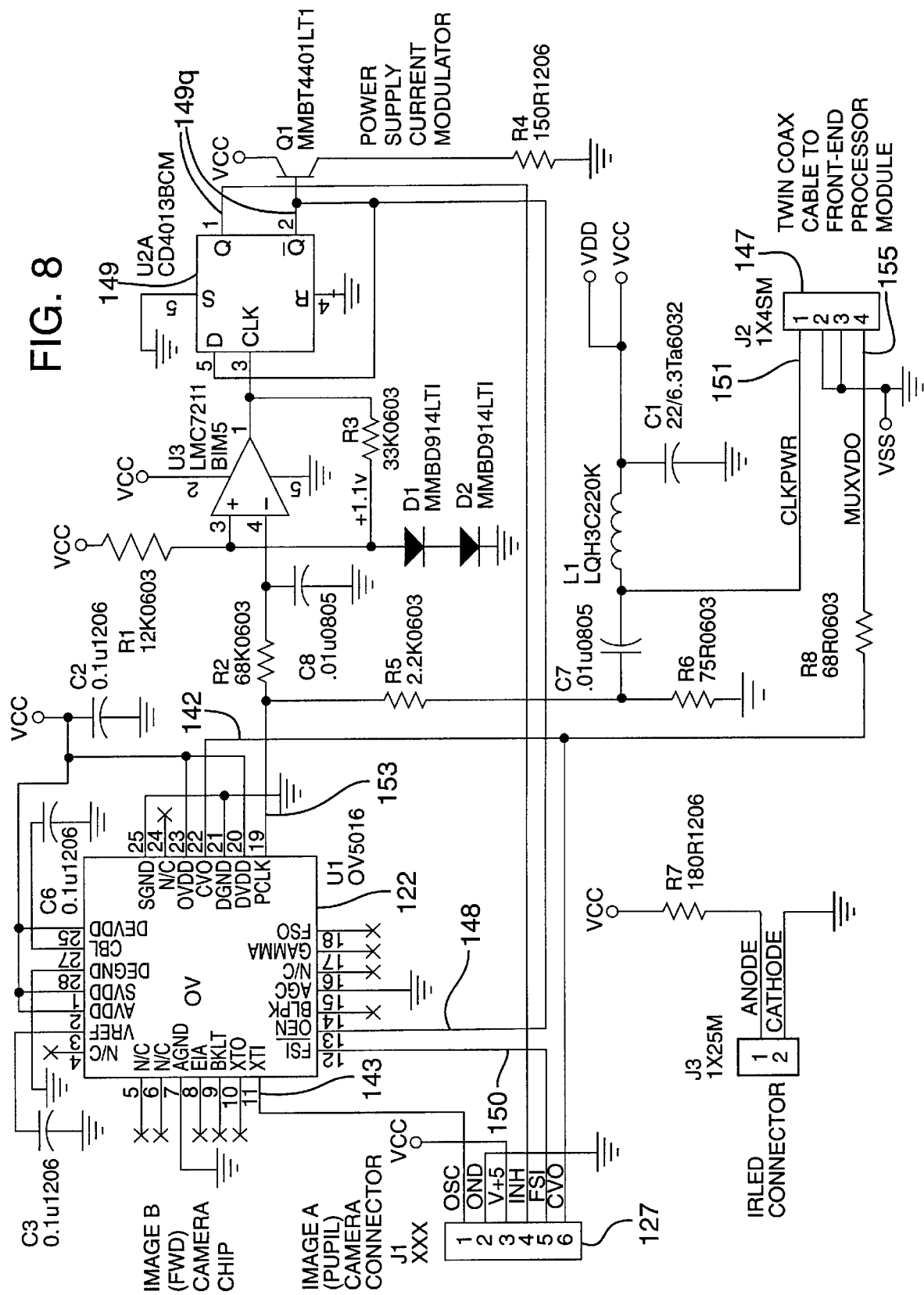
FIG. 8 is an electrical schematic of electronics associated with an image sensor for imaging the beacon of FIG. 6.

With reference to FIG. 8, a composite video signal from the image sensor 122 is delivered to a CVO output 142 at a rate set by the clock output 136 of the image sensor 112. The image sensor 122 receives a clock signal from the eye camera circuit board 102 at a clock input 143. The crystal 133 thus establishes the rate at which the pixels of the image sensors 112, 122 are delivered to their respective outputs 132, 142. These video outputs are combined and delivered from a connector 147 to the video processor 90 as "MUX- VDO." The clock signal is also supplied to the video processor 90. The image sensor 122 also has a frame synchronization input 150 and an inhibit input 148.

The image sensors 112, 122 have inhibit inputs 138, 148, respectively. A flip-flop 149 provides frame selection signals to the inhibit inputs 138, 148 based on the frame synchronization signal from the image sensor 112. The flip-flop 149 selects one of the image sensors 112, 122 using outputs 149q. The selected image sensor provides a composite video signal to the connector 147 while the composite video signal from the other image sensor is inhibited. After the selected image sensor delivers a frame, the flip-flop 149 selects the previously unselected image sensor and deselects the previously selected sensor. In this way, the composite video signals from the images sensors 112, 122 are delivered alternately to the connector 147 and the video processor 90. For convenience, the composite video signals are referred to herein as "multiplexed" and are delivered to the connector 147 by a connection labeled "MUXVDO."

In the preferred embodiment, the headset 70 contains the image sensors 112, 122. The headset 70 therefore must receive power for the image sensors and associated electronics as well as supplying the composite video signals to the video processor 90. Because the headset 70 is worn by the user, the cable 62 connecting the headset 70 and the video processor 90 is preferably light and flexible. To reduce the size and weight of the cable 62, the composite video signals, a pixel clock signal, and power are multiplexed onto two coaxial cables that make up the cable 62. The pixel clock signal from the image sensor 122 and electrical power to the image sensors 112, 122 are provided from a single connection 151 on the connector 147. The pixel clock signal is provided by an output 153 of the image sensor 122. The pixel clock signal is used to produce a frame identification signal to identify the source (i.e, image sensor 112 or image sensor 122) of the composite video signal at an output 155 of the connector 147. The frame identification signal appears at the output 151 as a current modulation while the pixel clock signal appears as a small amplitude voltage signal.

The composite video signals from the image sensors 112, 122 are delivered to the video processor 90 to determine locations of the beacon 95 or the eye 65. Although the image sensors 112, 122 image different objects (the eye 65 and the beacon 95, respectively), the locations are established in a similar manner in the preferred embodiment. By locating the eye 65, the gaze direction of the eye can be determined. By locating the user's head with respect to the beacon 95 as well, the gaze point 67 on the monitor 47 can be determined. Generally, a calibration procedure is carried out in which the user is requested to direct her gaze to several calibration points while the locations of the LEDs 111 and the eye 65 are measured.

Figure 9A:
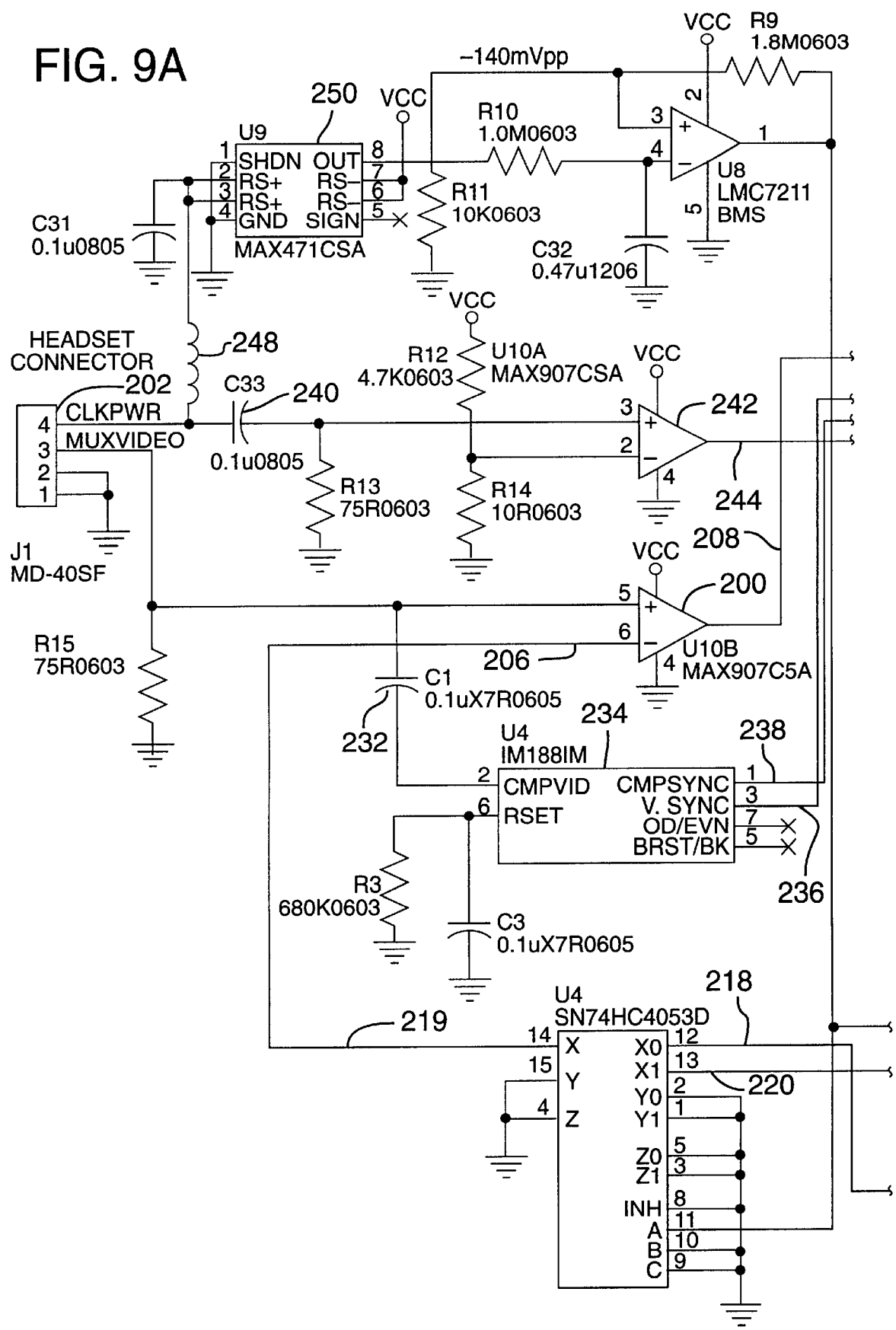
FIGS. 9A–9B are electrical schematics of a portion of the video processor of FIG. 2.
Figure 9B:
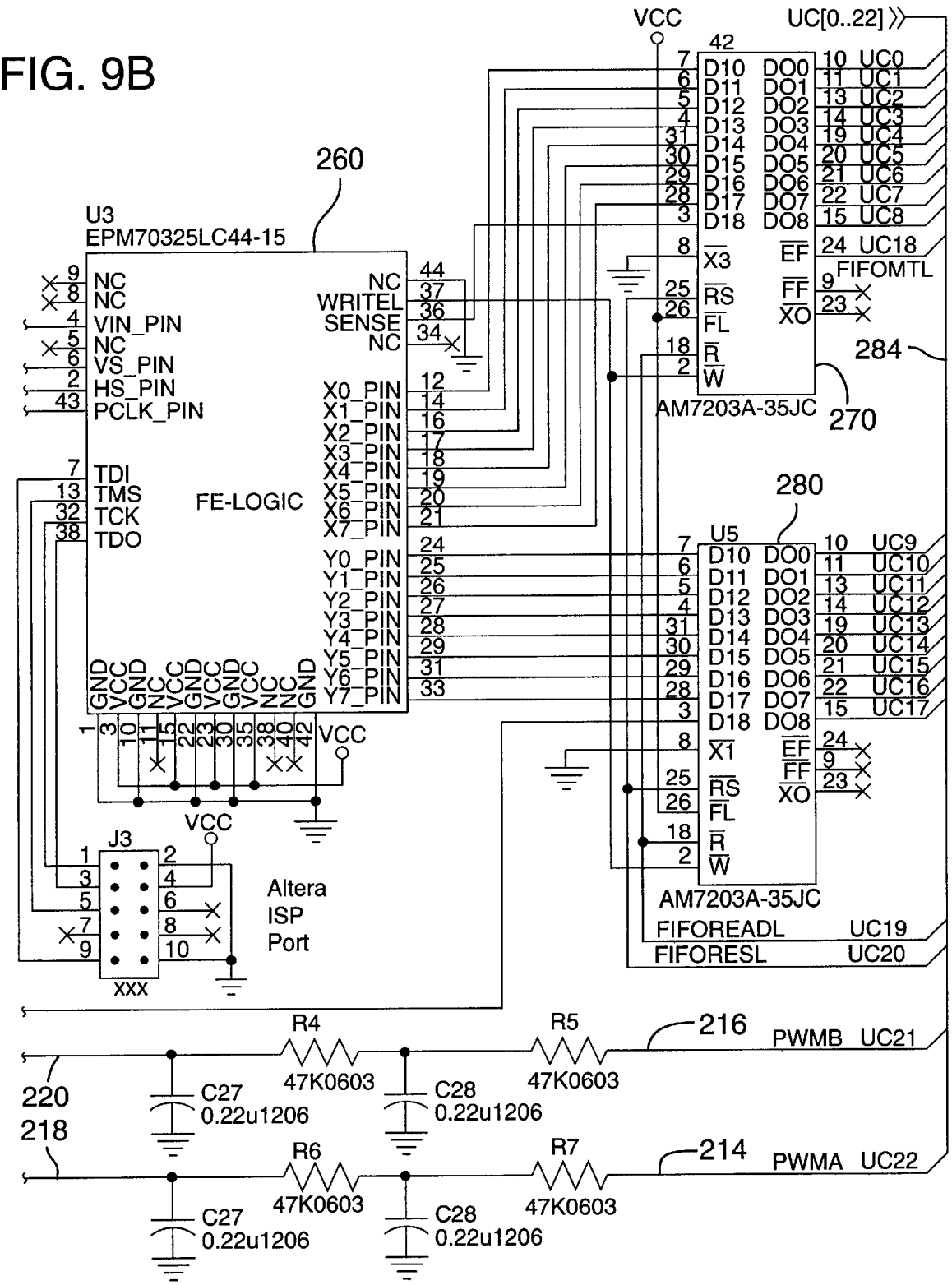

The processing of the composite video signals corresponding to images of the eye 65 and the beacon 95 by the video processor 90 to establish eye and beacon locations and hence the gaze point 67 is discussed with reference to FIGS. 9A–9B, illustrating a portion of the video processor 90. A comparator 200 receives multiplexed composite video (MUXVDO) from the image sensors 112, 122 from a headset connector 202. The composite video signals from the image sensors 112, 122 are alternately supplied to the video processor 90 on a frame by frame basis as selected by the flip-flop 149, as discussed above. The selected composite video signal is applied to a non-inverting input 204 of the comparator 200 and a reference voltage $V_c$ is applied to an inverting input 206. If the composite video signal is larger than the reference voltage $V_c$, a voltage corresponding to a logical "ON" is produced at an output 208. If the composite video signal level is smaller than the reference voltage, a voltage corresponding to a logical "OFF" is produced at the output 208. Generally, the logical ON and OFF voltages are approximately the power supply voltage to the comparator 200 (approximately +5 V) and ground (0 V), respectively. The comparator 200 thus transforms a composite video signal into a processed video signal consisting of a time varying mixture of ON and OFF voltages, i.e. the composite video signal is digitized in real time with 1-bit resolution. In an alternate digitization, portions of the composite video signal greater than or less than the reference voltage are converted into logical "OFF" and "ON" voltages respectively.

A portion on an exemplary composite video signal corresponding to a single horizontal row of pixels is shown in FIG. 10 as a waveform 210. The corresponding processed video signal after processing by the comparator 200 is shown as a waveform 212.

The reference voltage $V_c$ to the inverting input 206 is supplied by an integrated circuit 217 from an output 219. Inputs 214, 216 from a microcontroller 286 (shown in FIGS. 11A–11B) regulate the voltage delivered to the output 219. Alternatively, the reference voltage can be adjusted manually or other voltage reference can be provided. The inputs 214, 216 supply control voltages to inputs 218, 220 of an integrated circuit 217. Two inputs 214, 216 are provided so that the reference voltage $V_c$ to the comparator 200 is independently selectable for imaging the eye 65 and the beacon 95. Alternatively, the reference voltage $V_c$ can be set to two levels for imaging the beacon 95 or the eye 65.

The multiplexed video is also capacitively coupled through a capacitor 232 to a sync recovery integrated circuit 234. The integrated circuit 234 produces vertical sync and composite sync signals at outputs 236, 238, respectively.

The combined power and pixel clock signal from the connector 147 (shown in FIG. 8) is capacitively coupled via a capacitor 240 to a comparator 242 that produces a clock signal at an output 244. The combined power and frame ID signals are coupled via an inductor 246 to a current-sense amplifier 250.

A complex programmable logic device ("CPLD") 260 designed as an Altera EPM7032 programmable logic device receives the 1-bit video, the composite sync, the vertical sync, and the pixel clock signals. Objects imaged onto the image sensors 112, 122 are detected by the CPLD 220 as transitions from one logical voltage level to another. For example, an image of an LED has a bright central region surrounded by a darker region. After transmission by the comparator 200, such a video signal exhibits a transition from logical OFF to ON and back to OFF (dark-light-dark). The CPLD 260 detects such transitions and uses the vertical sync, composite sync, and pixel clock to locate these transitions in the image field and to record the transitions as an "event" in first-in, first-out memories ("FIFOs") 270, 280.

The FIFOs 270, 280 record events as four coordinates (x, y, direction, frameID). The location of a transition is recorded as a horizontal coordinate x and a vertical coordinate y. The x,y coordinates correspond to the location of the transition within a line (x) and the line in which the transition occurs (y). A direction of transition (either + for OFF to ON or − for ON to OFF) and frameID (either a eye image or a beacon image) is also recorded. The CPLD 260 generates the x and y coordinates as 8-bit binary numbers that are delivered from outputs X0_PIN through X7_PIN and Y0_PIN through Y7_PIN, respectively to inputs DI0 through DI7 of FIFOs 270, 280, respectively. Inputs DI8 of FIFOs 270, 280 receive the transition direction and the frame ID, respectively. The composite video signals from the image sensors 112, 122 are thereby reduced to a series of events by the CPLD 260, greatly reducing the amount of additional computation that must be carried out to locate the beacon 95 or the eye 65. The FIFOs 270, 280 output the events to a bus 284.

Figure 11A:
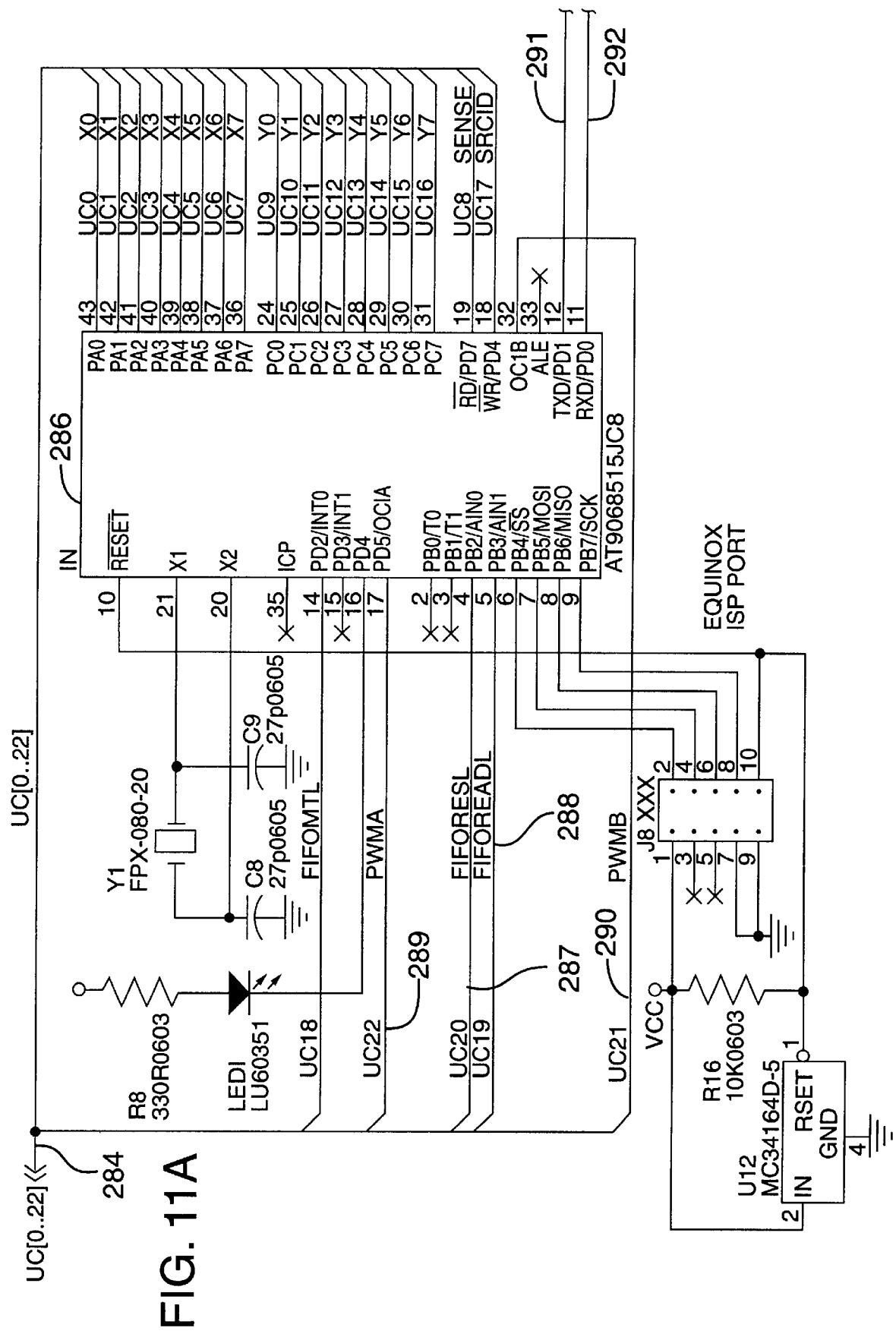
FIGS. 11A–11B are electrical schematics of a portion of the video processor illustrating the transmission of processed video (event data) to a serial port.
Figure 11B:
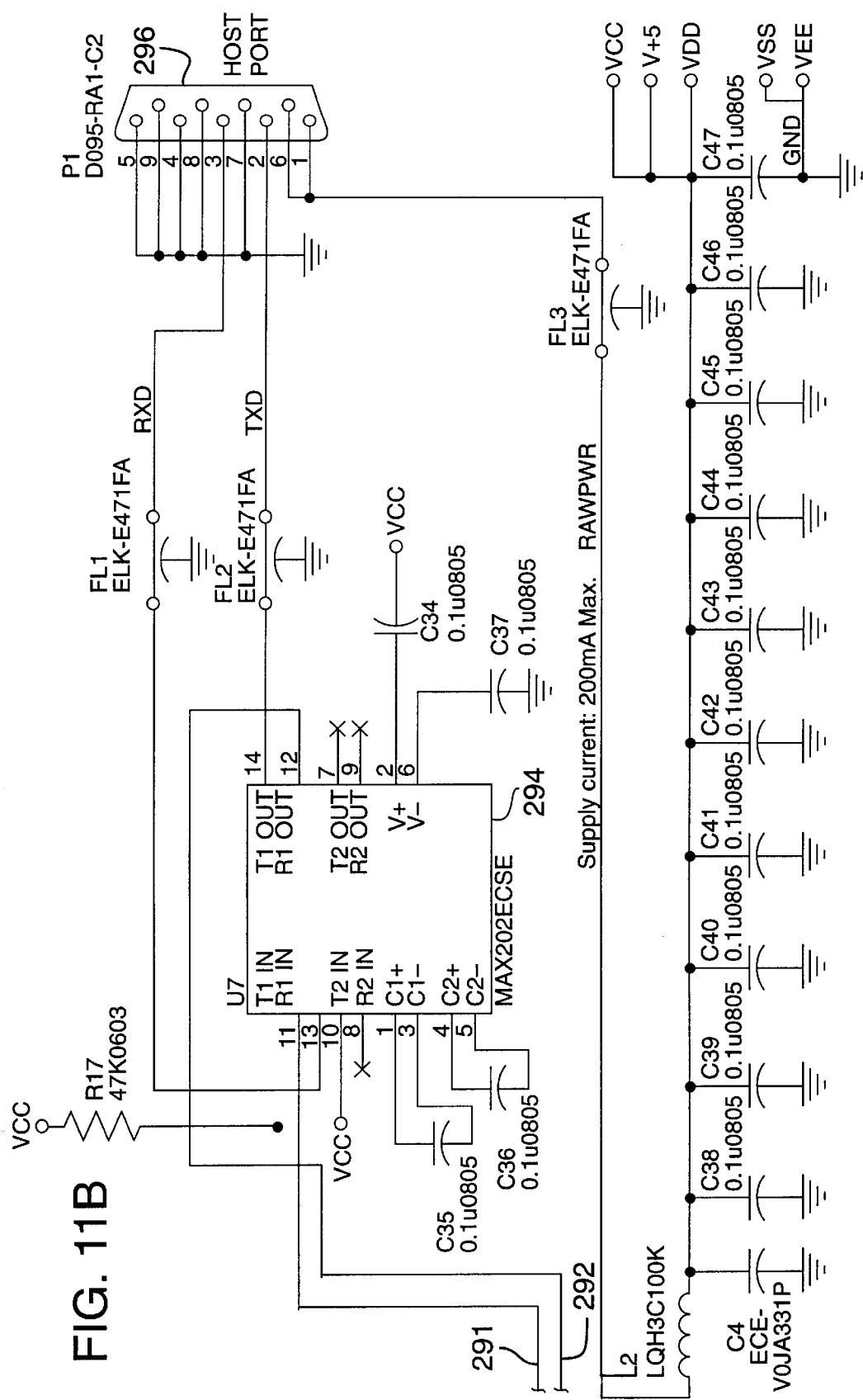

Referring to FIGS. 11A–11B, a microcontroller 286 receives the events from the FIFOs 270, 280 via the bus 284. The microcontroller 286 also provides control signals from outputs 287, 288 the reset or read-out, respectively, of the FIFOs 270, 280. In addition, outputs 289, 290 provide control signals to the inputs 214, 216 (see FIGS. 9A–9B) for control of the reference voltage $V_c$. Outputs 291, 292 communicate with a serial port (RS-232) transceiver 294. In the preferred embodiment, the transceiver 292 is a MAX202 integrated circuit, available from MAXIM, Inc. The transceiver communicates with the computer 20 from a connector 296.

Figure 12:
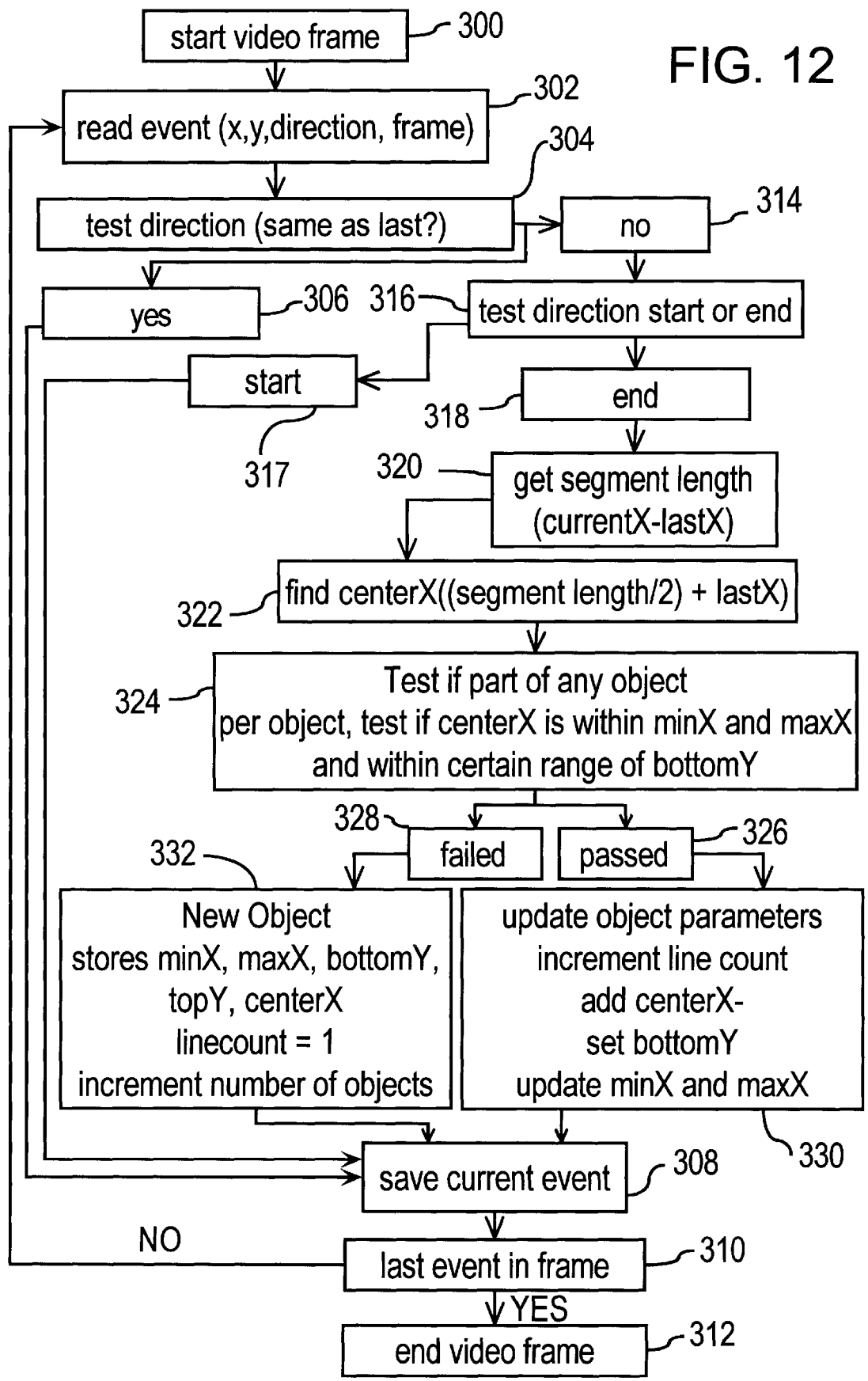
FIG. 12 is a block diagram illustrating a method for object location using event data from the video processor.

The events recorded in the FIFOs 270, 280 are processed by system firmware or software in order to locate the images of the eye 65 or the LEDs 111. In the preferred embodiment, the driver module 56 (see FIG. 1) performs the additional processing, but such processing can be incorporated into the video processor 90 or the headset 70. Referring to FIG. 12, a start video frame signal is received by a block 300 and a first event is transferred from the FIFOs 270, 280 by a read event block 302 as a current event having coordinates (currentx, currentY, current_direction, frameID). The current event is tested at a direction test block 304 to determine if the direction of the transition (i.e. from light to dark or dark to light) is the same as that of a previous event received. The previous event is stored as coordinates (lastx, lasty, last_direction, frameID).

If the direction test block 304 determines that the transition direction is the same as that of the previous event, then process control passes to the "yes" block 306 then to a save current event block 308. The current event is saved so that coordinates (lastx, lasty, last_direction, frameID) become the previous event for subsequent testing at the direction test block 304. If the directions are the same for the current event and the last event, an edge has not been located and no object data is recorded.

If the current event is the last event of the frame, processing is complete and control passes to the end video frame block 312. If more events are to be read, control passes back to the read event block 302.

If the direction test at direction test block 304 determines that the direction of the current event is different than that of the previous event, control passes to a "no" block 314 and then to a test direction start or end block 316. If the direction is positive (i.e. dark to light), an initial edge of a bright object (e.g., a LED or a eye reflection) has been detected. Processing then continues to a start block 317 and then to the save event block 308. If additional events remain to be read, processing returns to the read event block 302; otherwise, processing is complete and control passes to the end video frame block 312.

If the test direction block 304 finds that the directions have changed from + to − (light to dark), a second edge has been found and a new segment has been found. Processing proceeds to an end block 318. At processing block 320 a segment length=currentx−lastX is calculated and at processing block 322 centerX=segment length/2+lastX is calculated.

A test object block 324 then compares the centerX, segment length, currenty, and lastY values with values stored for previously located objects. If the new segment is part of a previously identified object, control proceeds to the passed block 326 and then to an update object parameters block 330. Generally, new segments that are adjacent previous objects are considered to be part of the previously identified object. Objects are specified by the number of horizontal lines in which the object has a segment (linecount), a sum of centerX (centerX_sum) for all segments in the object, bottom y and top y coordinates (bottomY, topY), and minimum and maximum x-coordinate values(minX, maxX).

If the event is not part of a previously located object, processing proceeds to the failed block 328 and then to a new object block 332. A new object is then stored as minX, maxX, bottomY, topY, centerX_sum, linecount=1 and the number of objects is incremented. The coordinates bottomY and topY record the smallest and largest y-coordinate values for an object and linecount is equal to the number of horizontal lines (video lines) contained by the object.

After recording the new object, control proceeds to the save current event block 308 and processing continues, either returning to read event block 302 or exiting to end video frame block 312.

Figure 13:
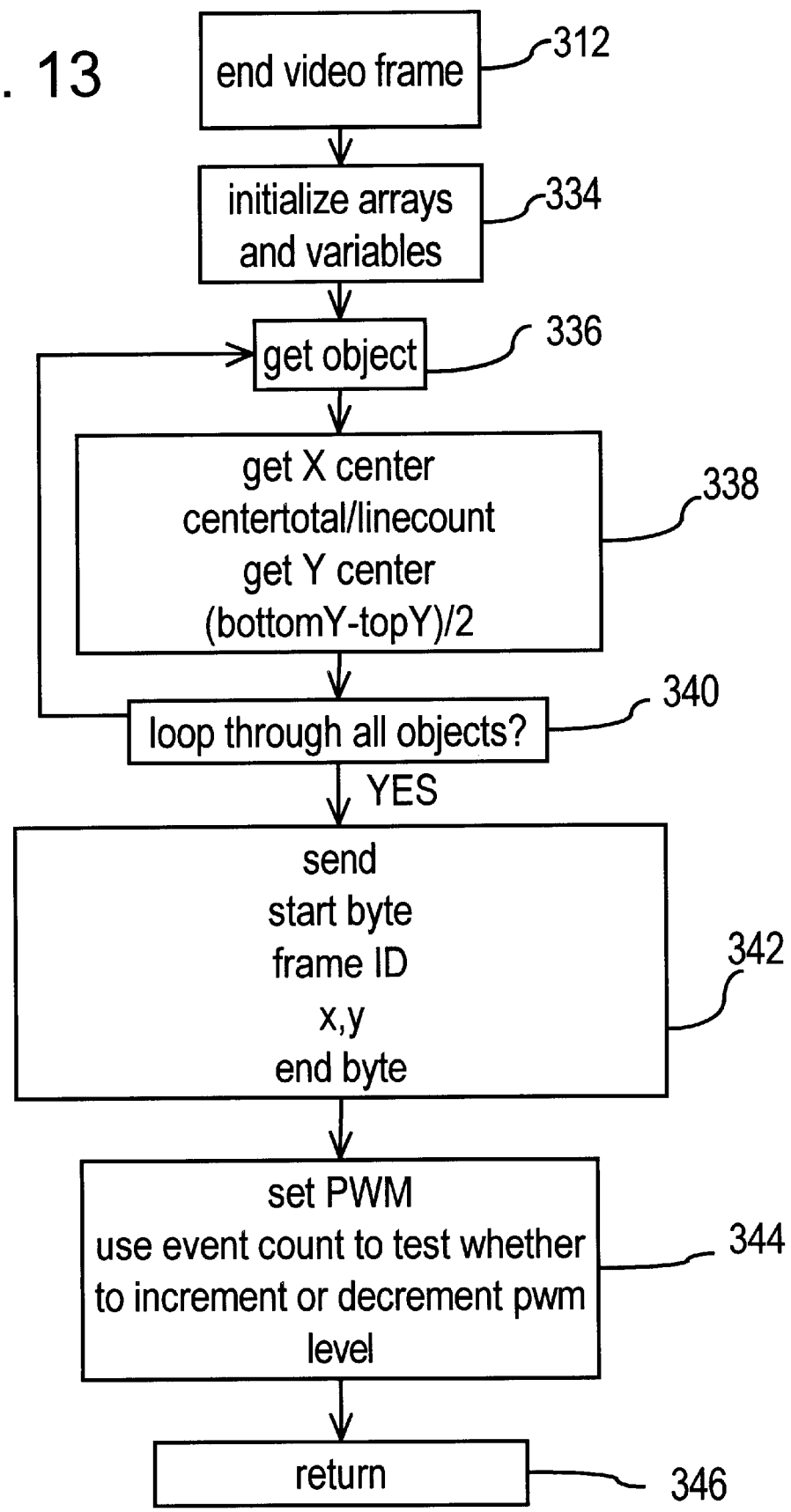
FIG. 13 is a block diagram illustrating a method for finding centers of objects.

After a frame is completely processed according to the process of FIG. 12, objects found are further processed as shown in FIG. 13. The end video frame block 312 transfers control to a block 334 that initialize arrays and variables. Object parameters for the first object are then obtained at a get object block 336. The object parameters are processed at a block 338 to calculate an value Xcenter=(sum of centerX)/linecount and a value Ycenter=(bottomY-topY)/2. After this calculation is complete, a block 340 tests if there are additional objects to be processed. If so, control transfers back to block 334.

After calculating Xcenter and Ycenter coordinates for all objects, the Xcenter, Ycenter values are transmitted by a block 342 along with a frame ID. A transmission start byte and a transmission end byte are also transmitted to facilitate communication. A control block 344 then uses the number of events or the number of objects detected in a frame to control the reference voltage $V_c$ to the comparator 200 by adjusting the pulse-width modulated signal applied to the inputs 218, 220 of the integrated circuit 217. The reference voltage $V_c$ is independently adjustable for eye frames and beacon frames. Because the eye frame is intended to image only the pupil, ideally only a single object is detected in the eye frame. The number of objects in the beacon frame depends on the number of LEDs used in the beacon 95. For either the eye frame or the beacon frame, a large number of detected objects indicates that objects other than the eye 65 or the LEDs are being detected. By adjusting the reference voltage $V_c$, the number of such objects detected can be reduced. Adjustment of the reference voltage $V_c$ also permits elimination of background noise. In addition, because the size of the LEDs is fixed, the corresponding image sizes at the image sensor depend primarily on the distance between the headset 72 and the monitor 47. The reference voltage $V_c$ can also be adjusted so that the detected objects corresponding to the LEDs 111 are appropriately sized. After adjusting the reference voltage $V_c$, control passes to an end block 346.

Eye frames and field frames are alternately processed as shown in FIGS. 12–13. Object date for objects located in the eye frames and field frames are stored separately. In the preferred embodiment, the object data is received by a software component that is executed by the processing unit 21. The software can be written in a variety of programming languages such as Visual Basic, C, C++ or other high-level languages or in a low level language such as assembly language. Alternatively, the object data can be processed by a microprocessor in the video processor 90.

Figure 14:
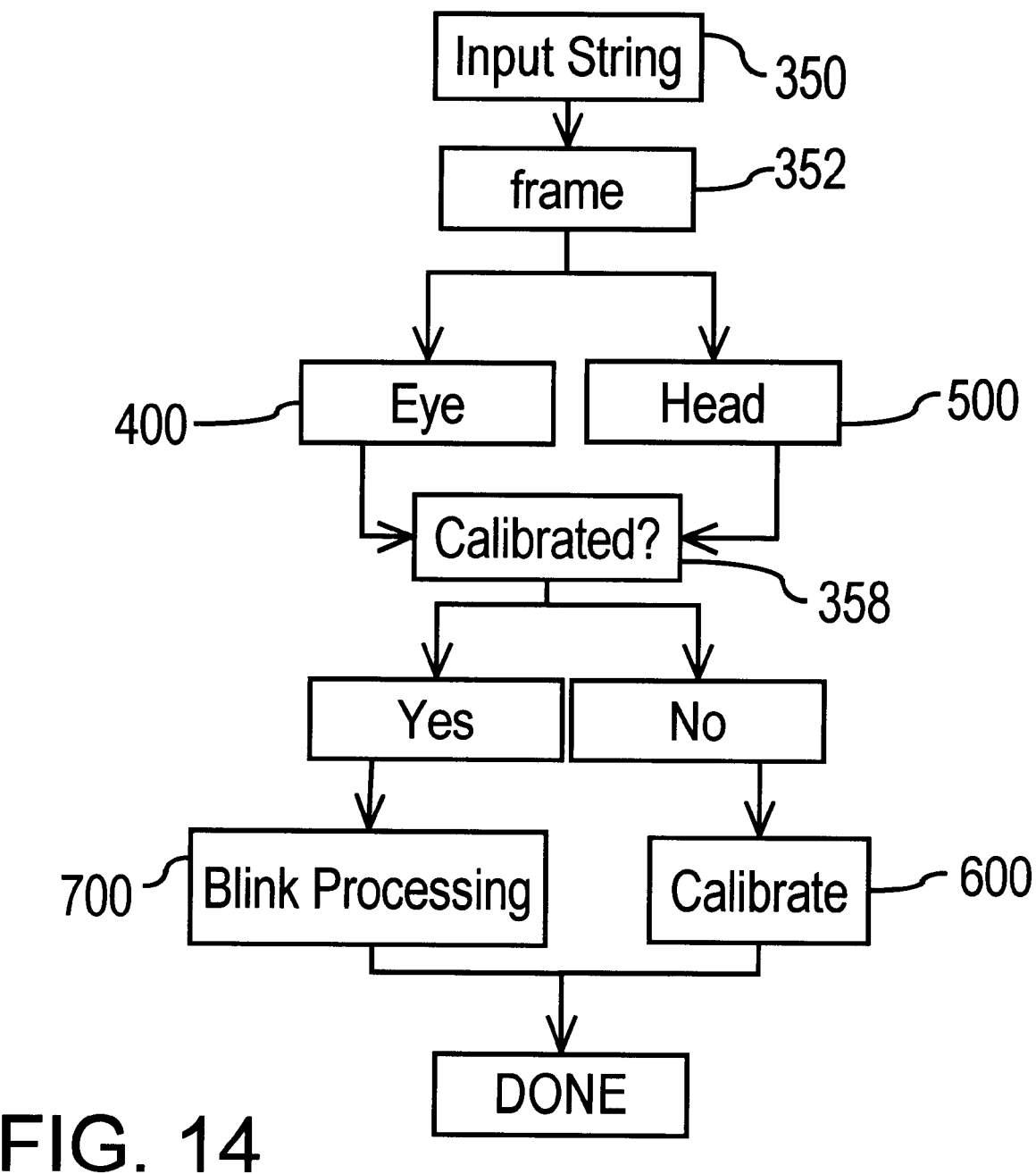
FIG. 14 is a block diagram illustrating a main control block.

With reference of FIG. 14, the driver module 56 receives the input string from the send block 342 at an input block 350. A frame block 352 then determines if the object is associated with the eye frame or the beacon frame and invokes either an eye frame block 400 or a head frame block 500 as appropriate. A calibration test block 358 then checks to see if calibration has been performed. If not, then the calibrate block 600 is executed and processing is complete. If a calibration has already been performed, a blink processing block 700 is executed. After execution of either the calibration block 600 or the blink processing block 700, processing is complete.

Figure 15:
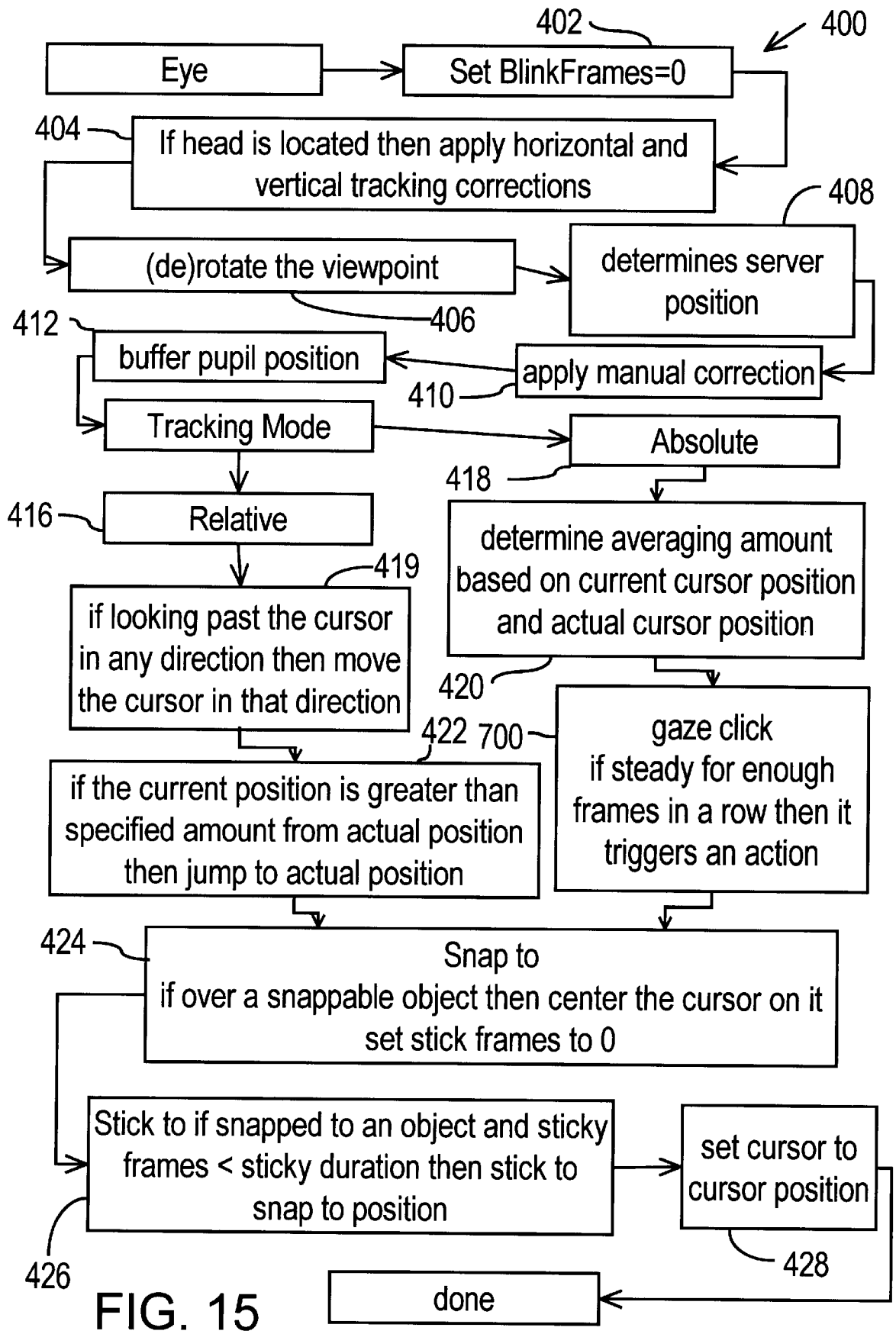
FIG. 15 is a block diagram illustrating cursor control processing.

With reference to FIG. 15, the eye frame block 400 begins by setting a variable BlinkFrames=0. If head tracking is in operation, blocks 404, 406, 408 apply tracking corrections, compensate for head rotation and determine a position of the user's head with respect to the beacon 95. If automatic correction does sufficiently align the gaze point 67 with the cursor 64, the user can manually apply correction at a block 410. The block 410 permits the user to direct cursor movement so that the cursor 64 and the gaze point coincide.

To compensate for normal, rapid, involuntary movements of the eye, the detected eye position is buffered by a block 412. In the preferred embodiment, eye frames and beacon frames are produced at a 30 Hz rate, or a frame every 1/30 sec. Typically determining a buffered eye position based on about 10 frames provides accurate position data with no effects due to involuntary eye movements. Buffering preferably uses 5–60 frames, or averaging for ⅙ sec to 2 sec.

A tracking mode selection block 412 permits selection of either a relative cursor tracking block 416 or an absolute cursor tracking block 418. If the absolute cursor tracking block 418 is selected, averaging parameters are selected at block 420. Averaging is convenient to remove the effects of involuntary eye motion so that the cursor 64 remains fixed for slight movements of the gaze point 67. A blink processing block 700 is then executed. If the gaze point 67 remains fixed for a predetermined number of frames (or time), an action can be triggered. The number of frames required to trigger an action is settable from a setup component 56a of the driver module 56. The blink processing block 700 is discussed in detail below.

If relative tracking is selected, a cursor control block 419 directs the cursor to move gradually toward the gaze point 67. This is to be contrasted with absolute tracking in which the cursor 64 is normally located at or near the gaze point 67. A circular buffer area surrounds the cursor position. The cursor 64 remains fixed until the gaze point 67 passes outside of the buffer area. Once the gaze point 67 moves outside the buffer area, the cursor 64 moves with the gaze point 67. The shape and area of the buffer area can be adjusted with the set up component 56a. If the gaze point 67 has moved at least a predetermined distance from the cursor position, the cursor is directed to jump to the gaze point by a block 422. The cursor typically is directed to jump when the gaze point and the cursor are widely separated. The setup component 56a of the driver module 56 provides for user adjustment of the predetermined distance. In general, if a distance greater than about 10% of the full width or height of the monitor 47 separates the cursor 64 and the gaze point 67, the block 422 directs the cursor 64 to jump. This jump of the cursor 64 is the same as that produced in absolute tracking.

Absolute and relative tracking both end at a snap block 424. For some objects displayed on the monitor 47, the cursor 64 is made to snap to the center of the object. Typically, the cursor 64 is directed to snap to the center of menu items, toolbar selections, and program icons. In the snap block 424, a variable stick frames is set to zero. A stick block 426 then executes. If the cursor 64 has snapped to an object and the variable stick frames is less than a predetermined variable sticky frames, the cursor 64 is directed to remain snapped to the object even if the gaze point 67 moves away. Once the gaze is directed away from the object for a predetermined number of frames (or time), the cursor 64 is directed to move normally, in either the relative or absolute tracking mode by a block 428.

Figure 16:
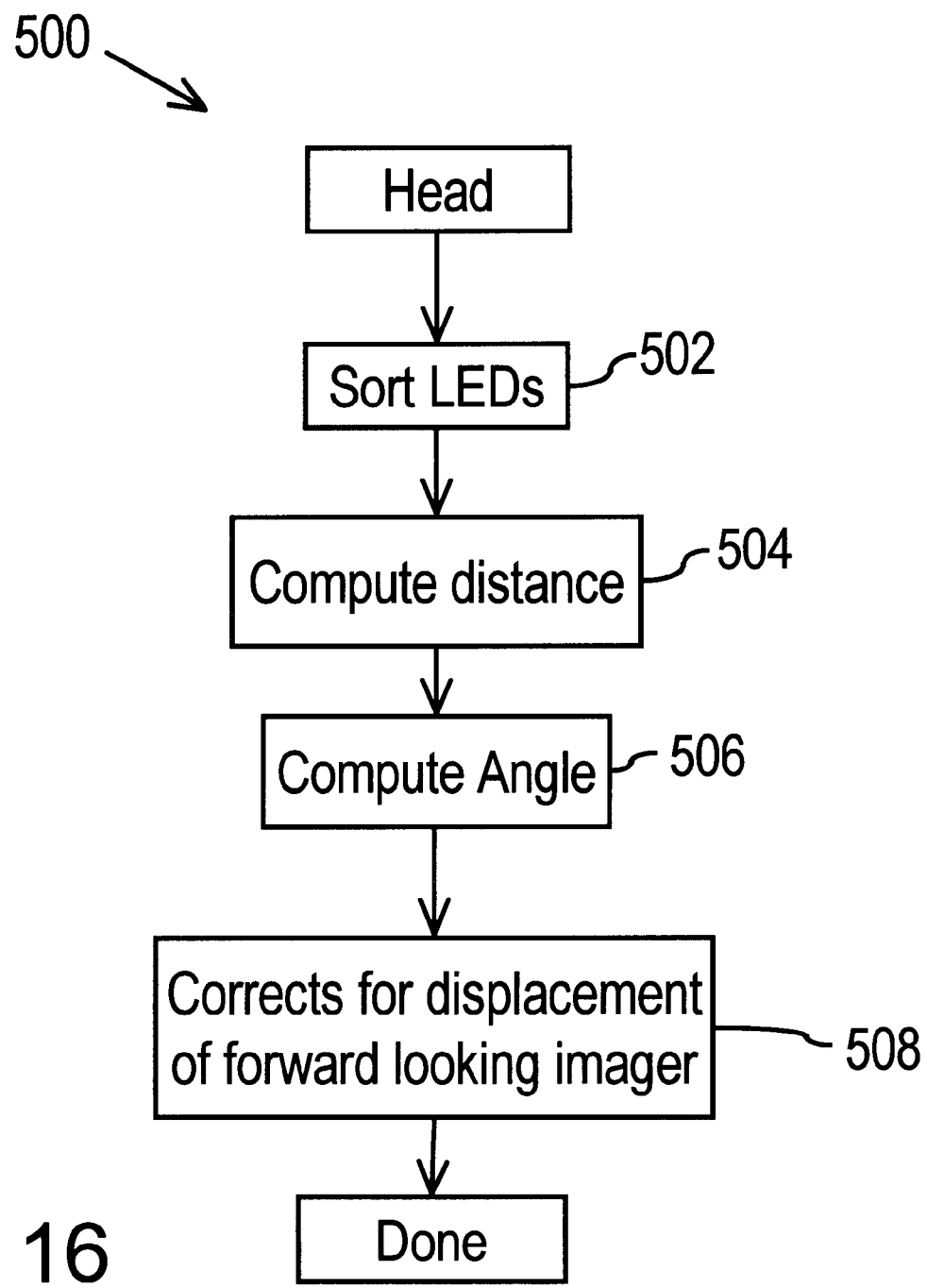
FIG. 16 is a block diagram illustrating head location.

Referring to FIG. 16, the head block 500 comprises a sort LED block 502 that associates objects detected in a beacon frame with corresponding LEDs of the beacon unit 95. A distance from the user to the beacon unit 95 is then calculated using the object data (corresponding to the LEDs 111) at a compute distance block 504. A rotation of the user's head with respect to the beacon 95 is calculated at a compute angle block 506. Finally, a correction for the offset of the user's gaze direction along the eye optics 110 with respect to the direction of view of the field optics 120 is calculated at a correction block 508. This correction completes the determination of the position and orientation of the user's head with respect to the beacon 95.

Figure 17:
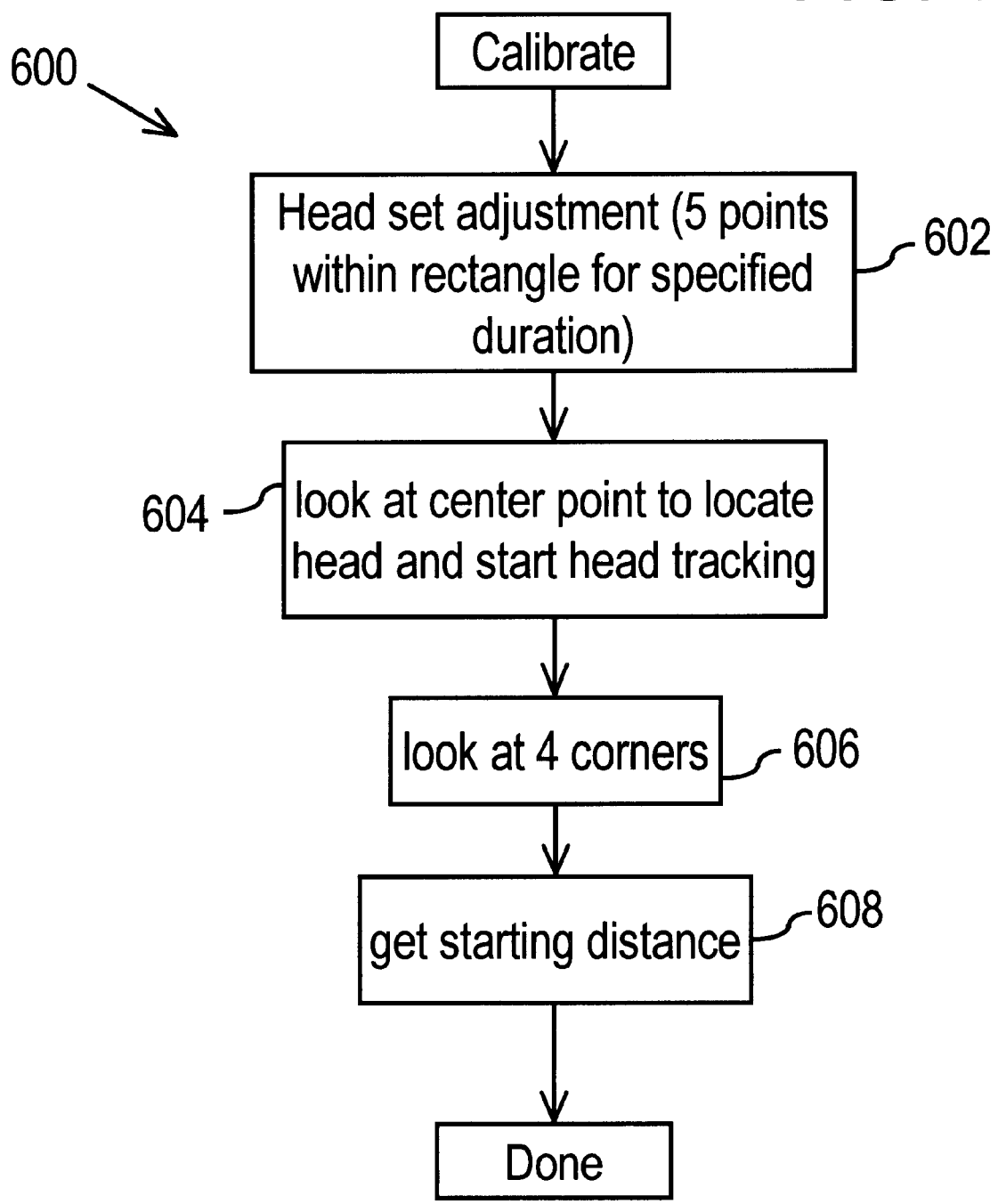
FIG. 17 is a block diagram illustrating procedures for nosepiece adjustment and calibration.

With reference to FIG. 17, the calibration block 600 begins with a headset adjustment 602. In this adjustment, the user adjusts the headset 70 so that images of the four LEDs 111 and the eye 65 are contained within a box displayed on the monitor 47 for a predetermined time. By sliding the nosepiece 78 along the slot 80 (see FIG. 3C), the eye image is brought into the box. This adjustment ensures that if the user is looking approximately straight ahead (e.g., toward the center of the monitor 47), then the image of the eye 65 is approximately at the center of the image sensor 112. The predetermined time is provided so that accidental or transitory alignment of the headset 70 is not mistakenly detected as a correct adjustment. A predetermined time of between 1–10 seconds typically is adequate but can be adjusted with the setup component 56a of the driver module 56.

After the headset 70 is adjusted, a block 604 directs the user to look at a center point on the monitor 47 and head tracking begins. At a block 606, the user is directed to look at cursors displayed at four corners of the monitor 47. The resulting gaze positions and cursor locations are used for calibration so that in operation, the cursor 64 can be accurately positioned with respect to the gaze point 67. Finally, at a block 608 a distance from the user to the beacon 95 ("head-beacon distance") is calculated from the images of the LEDs 117.

The head-beacon distance is calculated using object data corresponding to the images of the LEDs 111. In the preferred embodiment, the LEDs 111 are placed in a rectangular pattern. The head-beacon distance is calculated using the spacings of the LEDs 111 in the beacon 95 and the focal length of the lens 124 ($f_{124}$). For example, if objects (Xcenter1, Ycenter1) and (Xcenter2, Ycenter2) are identified as corresponding to LEDs 111a, 111b, the head-beacon distance is calculated as follows. First, the distance between these two objects at the image sensor 122 is calculated as $d_{image}$=sqrt((Xcenter1−Xcenter2)^2+(Ycenter1−Ycenter2) ^

2). The object data may need to be adjusted to correspond to the physical pixel separation at the image sensor 122. Such an adjustment can be carried out by multiplying $d_{image}$ by a scale factor. The head-beacon distance is then calculated as ($f_{124}/d_{image}$) times the actual separation of the LEDs 111*a*, 111*b* (i.e., 1 inch). If the head-beacon distance is not very much larger than the focal length $f_{124}$, a more exact formula can be used.

Using the sides of the rectangular pattern as well as the diagonals, six values for the head-beacon distance are obtained. These measured values can be averaged and values that appear inconsistent with other values can be discarded as erroneous. The separations of the objects corresponding to the LEDs 111 can also be used to detect and compensate for head rotations.

With reference to FIG. 18, the blink processing block 700 begins by executing an eye image block 702 to determine if an eye image is present. If there is no eye image, a "no" block 704 is executed (the eye is closed) and a variable BlinkFrames is incremented at block 706. BlinkFrames stores the number of eye frames for which the eye is closed (or a time for which the eye is closed). A block 708 stores a total number of frames for which the eye is closed (i.e., there is no eye image) in a variable SavedFrames. A block 708 divides the variable SavedFrames by a predetermined number of frames, stored as a variable FrameStep. If the remainder is zero, an alarm sounds. The alarm sounds to inform the user that the number of SavedFrames corresponds to an action level. Subsequent soundings of the alarm as SavedFrames increase by FrameStep, permit the user to select an action level. For example, a single alarm can be associated with a right mouse click, a second alarm with a left mouse click, and a third alarm with depressing a key on the keyboard 40. The user waits with her eye closed until the desired action level is reached (as SavedFrames increases). The setup component 56*a* permits assignment of actions levels to various inputs such as keystrokes or mouse clicks and also permits FrameStep to be adjusted. A timer can also be used to select action levels. Typically, FrameStep is in the range 15–90 frames, or 0.5–1.5 seconds.

If an eye image is present, then a "yes" block 703 is executed and BlinkFrames is set to zero. A test block 705 tests if SavedFrames is larger than BlinkFrames+1. If so, the eye (which is now open) was closed long enough to correspond to an action level, and an action block 709 executes the an action corresponding to the action level. If SavedFrames is less than BlinkFrames+1, no action is required and blink processing is complete.

In the preferred embodiment, an image of the eye 65 is formed on the image sensor 112 in order to detect eye movements. As the eye rotates, the eye position changes and the measurement of these changes permits the detection and quantification of eye movement. However, eye movement can also be detected by imaging reflections from the cornea or other surface of the eye and the methods and apparatus of the present invention are applicable to these methods.

In the preferred embodiment, video signals are represented as time-varying electrical voltages but it will be apparent that time-varying electrical currents can also be used. A reference current is then provided from a reference current source, instead of a reference voltage from a reference voltage source. In general, a reference signal from a reference source is used.

In addition, a time-varying reference signal can be used. In this case, the 1-bit digitized video is digitized with respect to different reference levels at different locations in the image. The reference signal can be varied on a frame by frame basis so that, for example, the video signal corresponding to the eye 65 is processed with a plurality of reference voltages.

In addition, while the preferred embodiment is described with respect to composite video signals, other video signal formats can also be accommodated. In addition, in the preferred embodiment, composite video signals from two image sensors are alternately processed on a frame by frame basis. Video processing can also be carried out on a line by line basis, or separate video processors can be provided for each image sensor.

In a gaze point tracking system for use with a computer, some or all computations can be performed using the central processing unit of the computer. In other applications, the computations can be completed within the video processor 90 or the computer 20.

The gaze point tracking apparatus uses distinct circuit components. It will be appreciated that the circuit components can be integrated onto a small number of integrated circuits, including integration with an image sensor.

If both eyes of a user are used, then the intersection of the lines of sight of the two eyes locates a gaze point in three dimensions. Location of the gaze point in three dimensions permits the focusing of optical systems at the gaze point based on the gaze point.

The methods and apparatus described herein are applicable to gaze tracking and head tracking, as well as gaze point tracking. In gaze tracking, movements of the gaze direction 66 are detected or measured but not necessarily associated with a gaze point 67. In head tracking, movements of the user's head are detected or measured.

An embodiment is described with reference to placing a cursor 64 at the gaze point 67, gaze point tracking and head tracking methods and apparatus are also applicable to heads-up displays, virtual and augmented reality displays, and wearable or see-through displays. In some applications, both head and gaze tracking are required, while in other application only head tracking or gaze tracking is necessary.

Whereas the invention has been described in connection with a preferred embodiment, it will be understood that the invention is not limited to this embodiment. On the contrary, the invention is intended to encompass all alternatives, modifications, and equivalents as may be included within the spirit and scope of the invention as defined by the appended claims.

What is claimed is:

1. A video processor, comprising:
   a video input configured to receive a video signal having a video amplitude;
   a reference input configured to receive a reference signal having a reference amplitude;
   an analog comparator that receives the video signal and the reference signal from the video input and the reference input, respectively, and produces a processed video signal having a first level when the reference amplitude is less than the video amplitude and a second level when the reference amplitude is greater than the video amplitude;

an event processor situated to receive the processed video signal and identify at least one coordinate corresponding to a transition between the first level and the second level in the processed video signal and associate an edge of an object with the coordinate; and an edge comparator configured to compare edges of the object with edges of a stored object to determine if the object is a new object or corresponds to the stored object.

2. A method of processing a video signal, comprising:

receiving the video signal;

comparing the video signal to a reference signal to produce a processed video signal having a first level when the video signal is less than the reference signal and a second level when the video signal is greater than the reference signal;

identifying at least one coordinate corresponding to a transition between the first level and the second level in the processed video signal;

identifying at least two coordinates and associating edges of an object with the coordinates; and comparing the edges of the object with edges of a stored object to determine if the object is a new object or corresponds to the stored object.

3. The method of claim 2, further comprising storing the edges of the object if the object is a new object.

4. The method of claim 2, further comprising updating the edges of the stored object if the object corresponds to the stored object.

* * * * *